United States Patent
Baek et al.

(10) Patent No.: US 12,164,047 B2
(45) Date of Patent: Dec. 10, 2024

(54) METHOD AND DEVICE FOR MEASURING LOCATION OF TERMINAL IN WIRELESS COMMUNICATION SYSTEM

(71) Applicant: LG ELECTRONICS INC., Seoul (KR)

(72) Inventors: Jongseob Baek, Seoul (KR); Woosuk Ko, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 309 days.

(21) Appl. No.: 17/639,868

(22) PCT Filed: Sep. 4, 2020

(86) PCT No.: PCT/KR2020/011952
§ 371 (c)(1),
(2) Date: Mar. 2, 2022

(87) PCT Pub. No.: WO2021/045565
PCT Pub. Date: Mar. 11, 2021

(65) Prior Publication Data
US 2022/0349978 A1 Nov. 3, 2022

(30) Foreign Application Priority Data
Sep. 4, 2019 (KR) .................. 10-2019-0109780

(51) Int. Cl.
*G01S 5/00* (2006.01)
*H04L 5/00* (2006.01)
(Continued)

(52) U.S. Cl.
CPC .......... *G01S 5/0036* (2013.01); *G01S 5/0072* (2013.01); *H04L 5/0051* (2013.01); *H04W 4/40* (2018.02); *H04W 72/1263* (2013.01)

(58) Field of Classification Search
CPC .... G01S 5/0036; G01S 5/00721; H04W 4/40; H04W 72/1263
See application file for complete search history.

(56) References Cited

U.S. PATENT DOCUMENTS

| 11,445,334 B1 * | 9/2022 | Bao ................. H04L 5/0094 |
| 2019/0230618 A1 * | 7/2019 | Saur ................. H04W 56/001 |

(Continued)

FOREIGN PATENT DOCUMENTS

| KR | 1020170007375 | 1/2017 |
| KR | 1020190018659 | 2/2019 |

OTHER PUBLICATIONS

Qualcomm Incorporated, "DL and UL NR Positioning Procedures," 3GPP TSG-RAN WG2 #107, R2-1909416, Aug. 2019, 12 pages.
(Continued)

*Primary Examiner* — Barry W Taylor
(74) *Attorney, Agent, or Firm* — LEE, HONG, DEGERMAN, KANG & WAIMEY

(57) ABSTRACT

An embodiment is a method for a terminal to perform an operation in a wireless communication system, the method including the steps of: transmitting a request positioning reference signal (PRS) to anchor nodes (ANs); receiving response PRSes for the request RPS from the ANs; and measuring the location of the terminal by using the request PRS and the response PRSes, wherein the terminal transmits scheduling information related to the request PRS and the response PRSes to the ANs.

11 Claims, 29 Drawing Sheets

(51) Int. Cl.
*H04W 4/40* (2018.01)
*H04W 72/1263* (2023.01)

(56) References Cited

U.S. PATENT DOCUMENTS

| | | | | |
|---|---|---|---|---|
| 2020/0028648 | A1* | 1/2020 | Akkarakaran | G01S 1/042 |
| 2020/0137715 | A1* | 4/2020 | Edge | H04W 64/00 |
| 2021/0311158 | A1* | 10/2021 | Akkarakaran | G01S 5/0036 |
| 2023/0047361 | A1* | 2/2023 | Bao | H04W 72/51 |
| 2023/0179359 | A1* | 6/2023 | Yerramalli | H04L 5/0094 |
| | | | | 370/329 |

OTHER PUBLICATIONS

Qualcomm Incorporated, "Local NR positioning in NG-RAN," 3GPP TSG-RAN WG3 #105, R3-193586, Aug. 2019, 33 pages.
PCT International Application No. PCT/KR2020/011952, Written Opinion of the International Searching Authority dated Dec. 8, 2020, 9 pages.

* cited by examiner

METHOD AND DEVICE FOR MEASURING LOCATION OF TERMINAL IN WIRELESS COMMUNICATION SYSTEM

CROSS-REFERENCE TO RELATED APPLICATIONS

This application is the National Stage filing under 35 U.S.C. 371 of International Application No. PCT/KR2020/011952, filed on Sep. 4, 2020, which claims the benefit of earlier filing date and right of priority to Korean Application No. 10-2019-0109780, filed on Sep. 4, 2019, the contents of which are all incorporated by reference herein in its entirety.

TECHNICAL FIELD

The following description relates to a wireless communication system and, more particularly, to a method and apparatus for measuring a location of a user equipment (UE) using sidelink communication.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A wireless communication system uses various radio access technologies (RATs) such as long term evolution (LTE), LTE-advanced (LTE-A), and wireless fidelity (WiFi). 5th generation (5G) is such a wireless communication system. Three key requirement areas of 5G include (1) enhanced mobile broadband (eMBB), (2) massive machine type communication (mMTC), and (3) ultra-reliable and low latency communications (URLLC). Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

A wireless communication system is a multiple access system that supports communication of multiple users by sharing available system resources (a bandwidth, transmission power, etc.). Examples of multiple access systems include a CDMA system, an FDMA system, a TDMA system, an OFDMA system, an SC-FDMA system, and an MC-FDMA system.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing RATs. Accordingly, a communication system is under discussion, for which services or UEs sensitive to reliability and latency are considered. The next-generation RAT in which eMBB, MTC, and URLLC are considered is referred to as new RAT or NR. In NR, V2X communication may also be supported.

FIG. 1 is a diagram illustrating V2X communication based on pre-NR RAT and V2X communication based on NR in comparison.

For V2X communication, a technique of providing safety service based on V2X messages such as basic safety message (BSM), cooperative awareness message (CAM), and decentralized environmental notification message (DENM) was mainly discussed in the pre-NR RAT. The V2X message may include location information, dynamic information, and attribute information. For example, a UE may transmit a CAM of a periodic message type and/or a DENM of an event-triggered type to another UE.

For example, the CAM may include basic vehicle information including dynamic state information such as a direction and a speed, vehicle static data such as dimensions, an external lighting state, path details, and so on. For example, the UE may broadcast the CAM which may have a latency less than 100 ms. For example, when an unexpected incident occurs, such as breakage or an accident of a vehicle, the UE may generate the DENM and transmit the DENM to another UE. For example, all vehicles within the transmission range of the UE may receive the CAM and/or the DENM. In this case, the DENM may have priority over the CAM.

In relation to V2X communication, various V2X scenarios are presented in NR. For example, the V2X scenarios include vehicle platooning, advanced driving, extended sensors, and remote driving.

For example, vehicles may be dynamically grouped and travel together based on vehicle platooning. For example, to perform platoon operations based on vehicle platooning, the vehicles of the group may receive periodic data from a leading vehicle. For example, the vehicles of the group may widen or narrow their gaps based on the periodic data.

For example, a vehicle may be semi-automated or full-automated based on advanced driving. For example, each vehicle may adjust a trajectory or maneuvering based on data obtained from a nearby vehicle and/or a nearby logical entity. For example, each vehicle may also share a dividing intention with nearby vehicles.

Based on extended sensors, for example, raw or processed data obtained through local sensor or live video data may be exchanged between vehicles, logical entities, terminals of pedestrians and/or V2X application servers. Accordingly, a vehicle may perceive an advanced environment relative to an environment perceivable by its sensor.

Based on remote driving, for example, a remote driver or a V2X application may operate or control a remote vehicle on behalf of a person incapable of driving or in a dangerous environment. For example, when a path may be predicted as in public transportation, cloud computing-based driving may be used in operating or controlling the remote vehicle. For example, access to a cloud-based back-end service platform may also be used for remote driving.

A scheme of specifying service requirements for various V2X scenarios including vehicle platooning, advanced driving, extended sensors, and remote driving is under discussion in NR-based V2X communication.

DISCLOSURE

Technical Problem

An object of embodiment(s) is to provide any procedure to be performed to measure the location of a UE using sidelink communication.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an embodiment, provided herein is a method of performing an operation by a user equipment (UE) in a wireless communication system, including transmitting a request positioning reference signal (PRS) to anchor nodes (ANs), receiving response PRSs to the request PRS from the ANs, and measuring a location of the UE using the request PRS and the response PRSs, wherein the UE transmits scheduling information related to the request PRS and the response PRSs to the ANs.

According to an embodiment, provided herein is a user equipment (UE) in a wireless communication system, including at least one processor, and at least one computer memory operably connected to the at least one processor and configured to store instructions causing, when executed, the at least one processor to perform operations, wherein the operations include transmitting a request positioning reference signal (PRS) to anchor nodes (ANs), receiving response PRSs to the request PRS from the ANs, and measuring a location of the UE using the request PRS and the response PRSs, and wherein the UE transmits scheduling information related to the request PRS and the response PRSs to the ANs.

According to an embodiment, provided herein is a processor for performing operations for a user equipment (UE) in a wireless communication system, wherein the operations include transmitting a request positioning reference signal (PRS) to anchor nodes (ANs), receiving response PRSs to the request PRS from the ANs, and measuring a location of the UE using the request PRS and the response PRSs, and wherein the UE transmits scheduling information related to the request PRS and the response PRSs to the ANs.

A computer-readable storage medium for storing at least one computer program including instructions for causing, when executed by at least one processor, the at least one processor to perform operations for a user equipment (UE), wherein the operations include transmitting a request positioning reference signal (PRS) to anchor nodes (ANs), receiving response PRSs to the request PRS from the ANs, and measuring a location of the UE using the request PRS and the response PRSs, and wherein the UE transmits scheduling information related to the request PRS and the response PRSs to the ANs.

The response PRSs may be configured with different patterns with respect to the ANs.

One-to-many correspondence between scheduling information of the request PRS and scheduling information of the response PRSs related with the scheduling information of the request PRS may be preconfigured.

The scheduling information related to the request PRS and the response PRSs may include only the scheduling information of the request PRS, and the scheduling information of the response PRSs may be determined by the scheduling information of the request PRS.

The scheduling information related to the request PRS and the response PRSs may include scheduling information of the request PRS and scheduling information of the response PRSs.

The request PRS may be transmitted in a vehicle-to-everything (V2X) slot or a PRS dedicated slot, and the response PRSs may be transmitted in the PRS dedicated slot.

The method may further include receiving information about an arrival time of the request PRS and transmission times of the response PRSs from the ANs.

The information about the arrival time of the request PRS and the transmission times of the response PRSs may be received through a physical sidelink shared channel (PSSCH).

The ANs may form a group for measuring the location of the UE.

The UE may communicate with at least one of another UE, a UE related to an autonomous driving vehicle, a base station, or a network.

Advantageous Effects

According to an embodiment, the location of a UE may be measured using sidelink communication, and a request PRS and a response PRS may be rapidly scheduled.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure, provide embodiments of the present disclosure together with detail explanation.

BEST MODE FOR DISCLOSURE

In various embodiments of the present disclosure, "I" and "," should be interpreted as "and/or". For example, "A/B" may mean "A and/or B". Further, "A, B" may mean "A and/or B". Further, "A/B/C" may mean "at least one of A, B and/or C". Further, "A, B, C" may mean "at least one of A, B and/or C".

In various embodiments of the present disclosure, "or" should be interpreted as "and/or". For example, "A or B" may include "only A", "only B", and/or "both A and B". In other words, "or" should be interpreted as "additionally or alternatively".

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA), or the like. IEEE 802.16m is an evolution of IEEE 802.16e, offering backward compatibility with an IRRR 802.16e-based system. UTRA is a part of universal mobile telecommunications system (UMTS). 3rd generation partnership project (3GPP) long term evolution (LTE) is a part of evolved UMTS (E-UMTS) using evolved UTRA (E-UTRA). 3GPP LTE employs OFDMA for downlink (DL) and SC-FDMA for uplink (UL). LTE-advanced (LTE-A) is an evolution of 3GPP LTE.

A successor to LTE-A, 5th generation (5G) new radio access technology (NR) is a new clean-state mobile communication system characterized by high performance, low latency, and high availability. 5G NR may use all available spectral resources including a low frequency band below 1 GHz, an intermediate frequency band between 1 GHz and 10 GHz, and a high frequency (millimeter) band of 24 GHz or above.

While the following description is given mainly in the context of LTE-A or 5G NR for the clarity of description, the technical idea of an embodiment of the present disclosure is not limited thereto.

Figure 1:
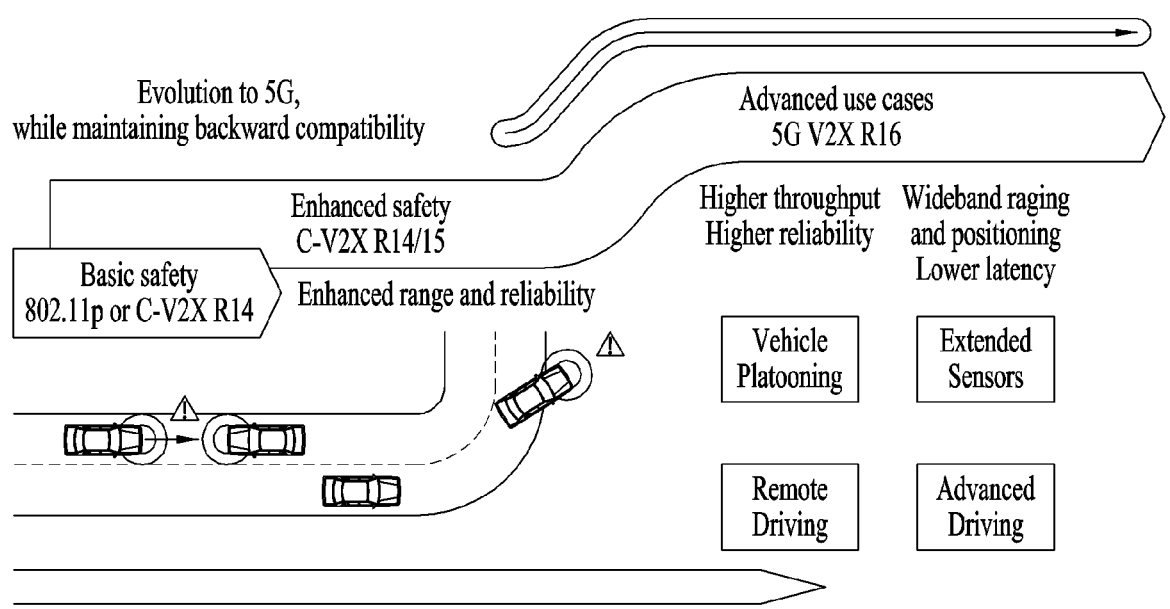
FIG. 1 is a diagram illustrating vehicle-to-everything (V2X) communication based on pre-new radio access technology (NR) RAT and V2X communication based on NR in comparison.
Figure 2:
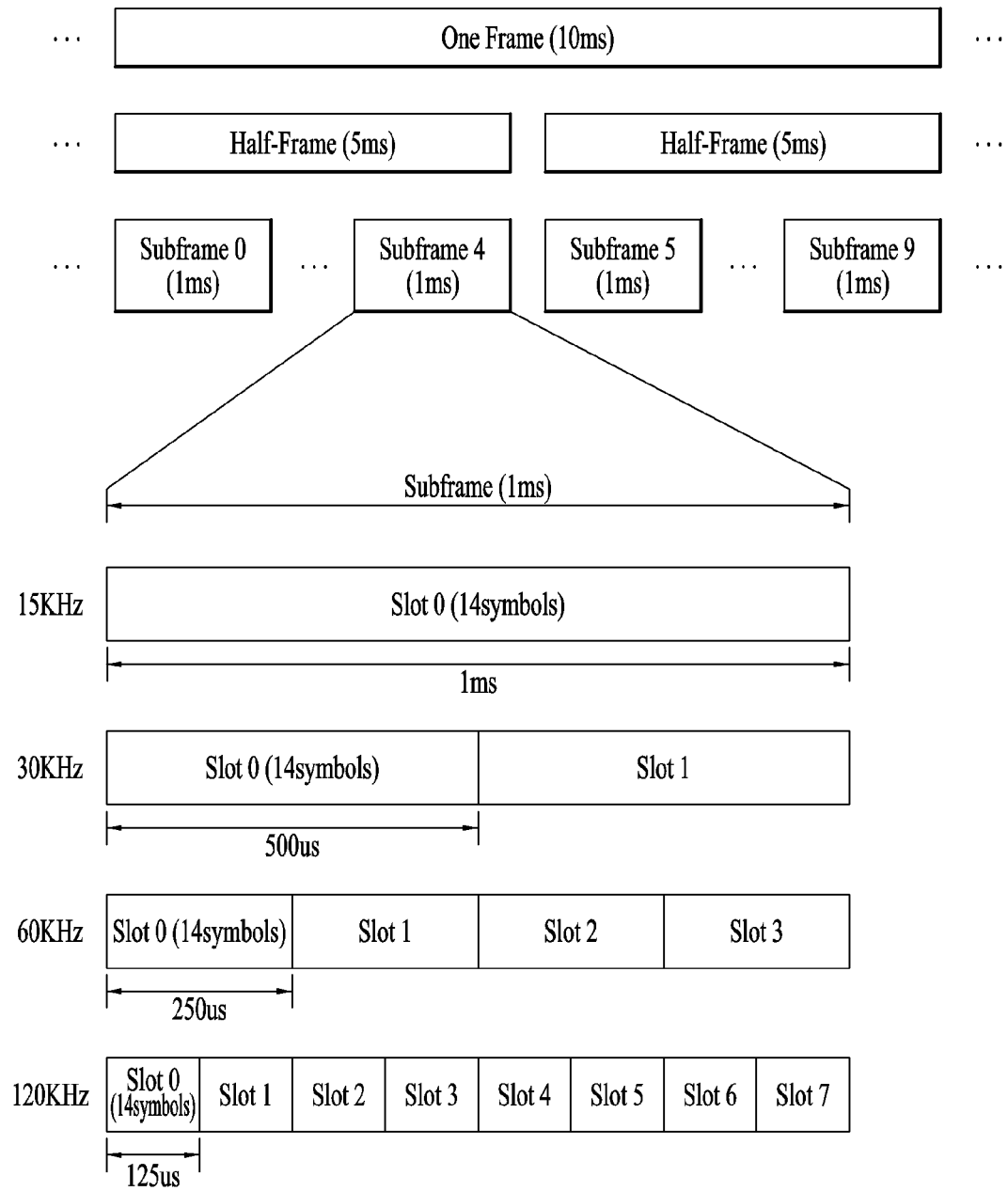
FIG. 2 is a diagram illustrating the structure of an NR radio frame to which embodiment(s) of the present disclosure is applicable.

FIG. 2 illustrates a radio frame structure in NR, to which embodiment(s) of the present disclosure is applicable.

Referring to FIG. 2, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,u}_{slot}$, and the number of slots per subframe $N^{subframe,u}_{slot}$ according to an SCS configuration μ in the NCP case.

TABLE 1

| SCS (15 * 2u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15 * 2 + u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource including the same number of symbols (e.g., a subframe, slot, or TTI) (collectively referred to as a time unit (TU) for convenience) may be configured to be different for the aggregated cells.

In NR, various numerologies or SCSs may be supported to support various 5G services. For example, with an SCS of 15 kHz, a wide area in traditional cellular bands may be supported, while with an SCS of 30 kHz/60 kHz, a dense urban area, a lower latency, and a wide carrier bandwidth may be supported. With an SCS of 60 kHz or higher, a bandwidth larger than 24.25 GHz may be supported to overcome phase noise.

An NR frequency band may be defined by two types of frequency ranges, FR1 and FR2. The numerals in each frequency range may be changed. For example, the two types of frequency ranges may be given in [Table 3]. In the NR system, FR1 may be a "sub 6 GHz range" and FR2 may be an "above 6 GHz range" called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerals in a frequency range may be changed in the NR system. For example, FR1 may range from 410 MHz to 7125 MHz as listed in [Table 4]. That is, FR1 may include a frequency band of 6 GHz (or 5850, 5900, and 5925 MHz) or above. For example, the frequency band of 6 GHz (or 5850, 5900, and 5925 MHz) or above may include an unlicensed band. The unlicensed band may be used for various purposes, for example, vehicle communication (e.g., autonomous driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 3:
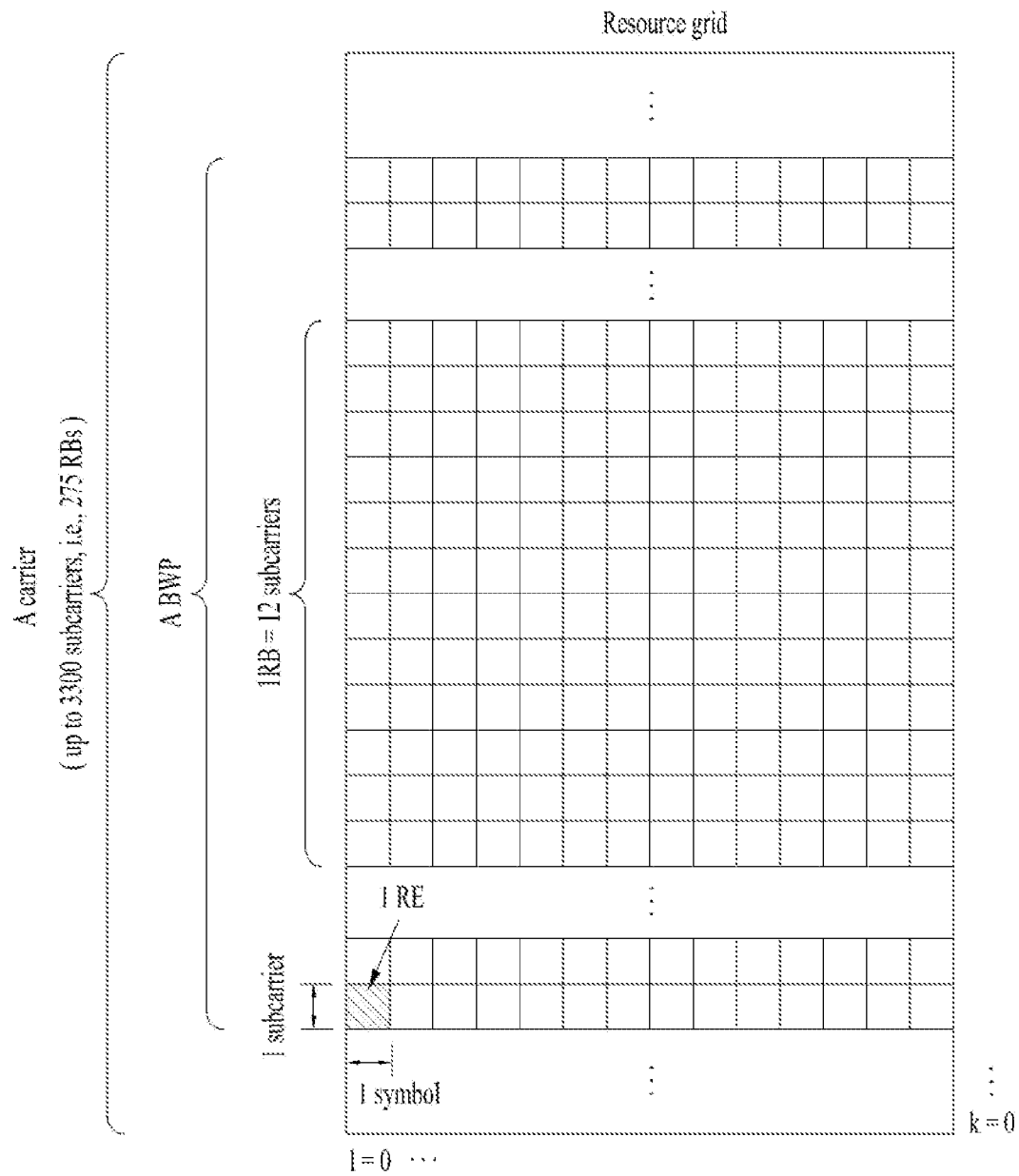
FIG. 3 is a diagram illustrating a slot structure in an NR frame according to an embodiment of the present disclosure.

FIG. 3 illustrates a slot structure in an NR frame according to an embodiment of the present disclosure.

Referring to FIG. 3, a slot includes a plurality of symbols in the time domain. For example, one slot may include 14 symbols in an NCP case and 12 symbols in an ECP case. Alternatively, one slot may include 7 symbols in an NCP case and 6 symbols in an ECP case.

A carrier includes a plurality of subcarriers in the frequency domain. An RB may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, or the like). A carrier may include up to N (e.g., 5) BWPs. Data communication may be conducted in an activated BWP. Each element may be referred to as a resource element (RE) in a resource grid, to which one complex symbol may be mapped.

A radio interface between UEs or a radio interface between a UE and a network may include L1, L2, and L3. In various embodiments of the present disclosure, L1 may refer to the PHY layer. For example, L2 may refer to at least one of the MAC layer, the RLC layer, the PDCH layer, or the SDAP layer. For example, L3 may refer to the RRC layer.

Now, a description will be given of V2X or sidelink (SL) communication.

Figure 4:
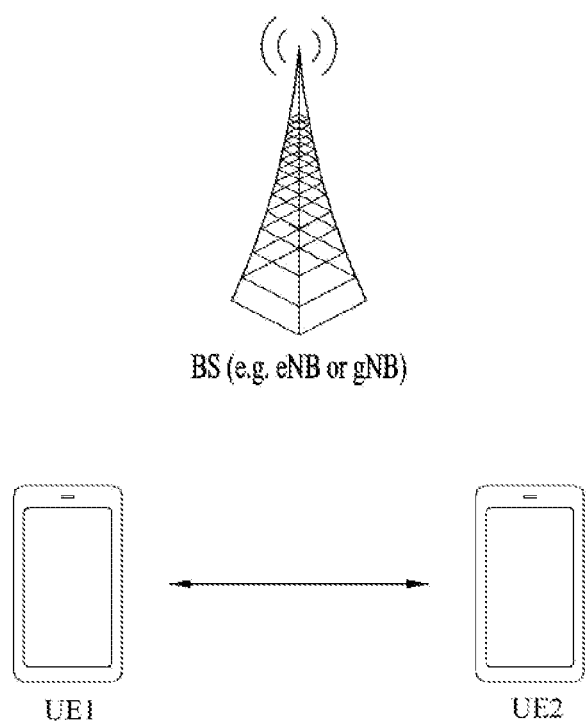
FIG. 4 is a diagram illustrating user equipments (UEs) which conduct V2X or SL communication between them according to an embodiment of the present disclosure.

FIG. 4 illustrates UEs that conduct V2X or SL communication between them according to an embodiment of the present disclosure.

Referring to FIG. 4, the term "UE" in V2X or SL communication may mainly refer to a terminal of a user. However, when network equipment such as a BS transmits and receives a signal according to a UE-to-UE communication scheme, the BS may also be regarded as a kind of UE. For example, a first UE (UE1) may be a first device 100 and a second UE (UE2) may be a second device 200.

For example, UE1 may select a resource unit corresponding to specific resources in a resource pool which is a set of resources. UE1 may then transmit an SL signal in the resource unit. For example, UE2, which is a receiving UE, may be configured with the resource pool in which UE1 may transmit a signal, and detect the signal from UE1 in the resource pool.

When UE1 is within the coverage of the BS, the BS may indicate the resource pool to UE1. On the contrary, when UE1 is outside the coverage of the BS, another UE may indicate the resource pool to UE1, or UE1 may use a predetermined resource pool.

In general, a resource pool may include a plurality of resource units, and each UE may select one or more resource units and transmit an SL signal in the selected resource units.

Figure 5:
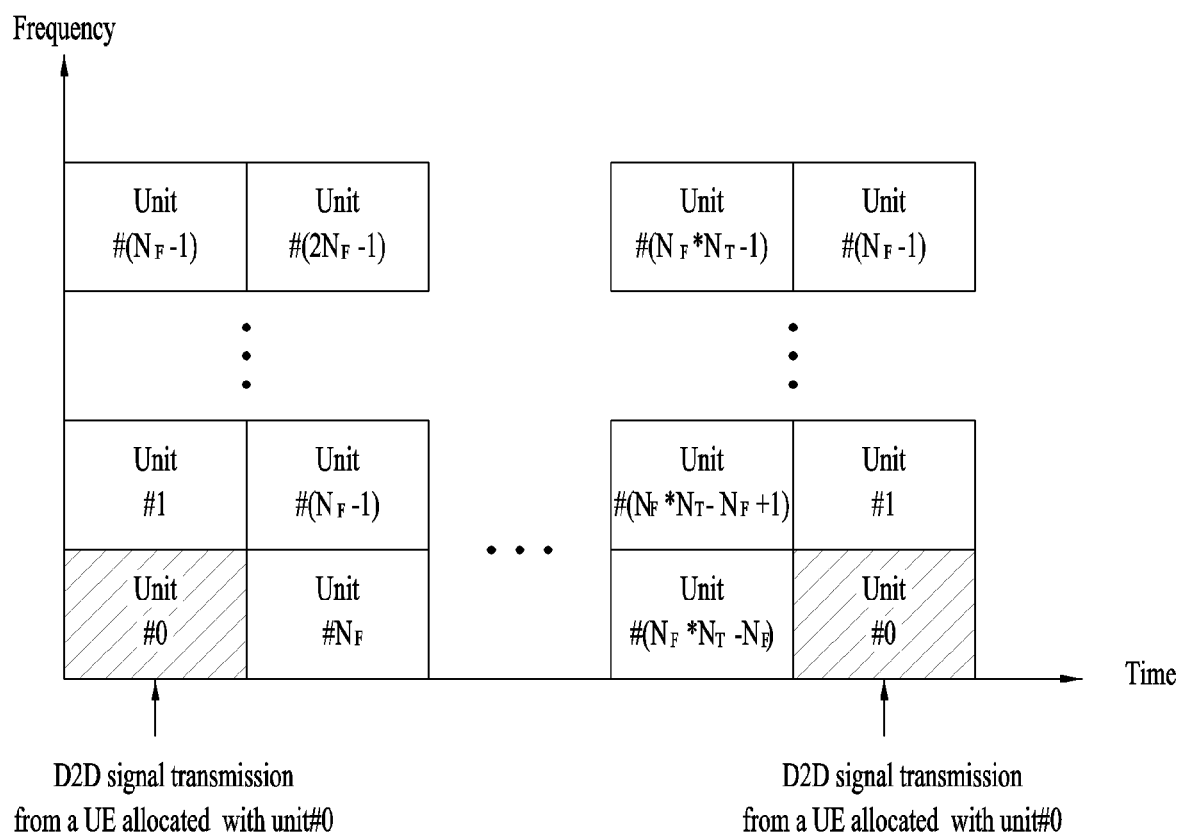
FIG. 5 is diagram illustrating resource units for V2X or SL communication according to an embodiment of the present disclosure.

FIG. 5 illustrates resource units for V2X or SL communication according to an embodiment of the present disclosure.

Figure 13:
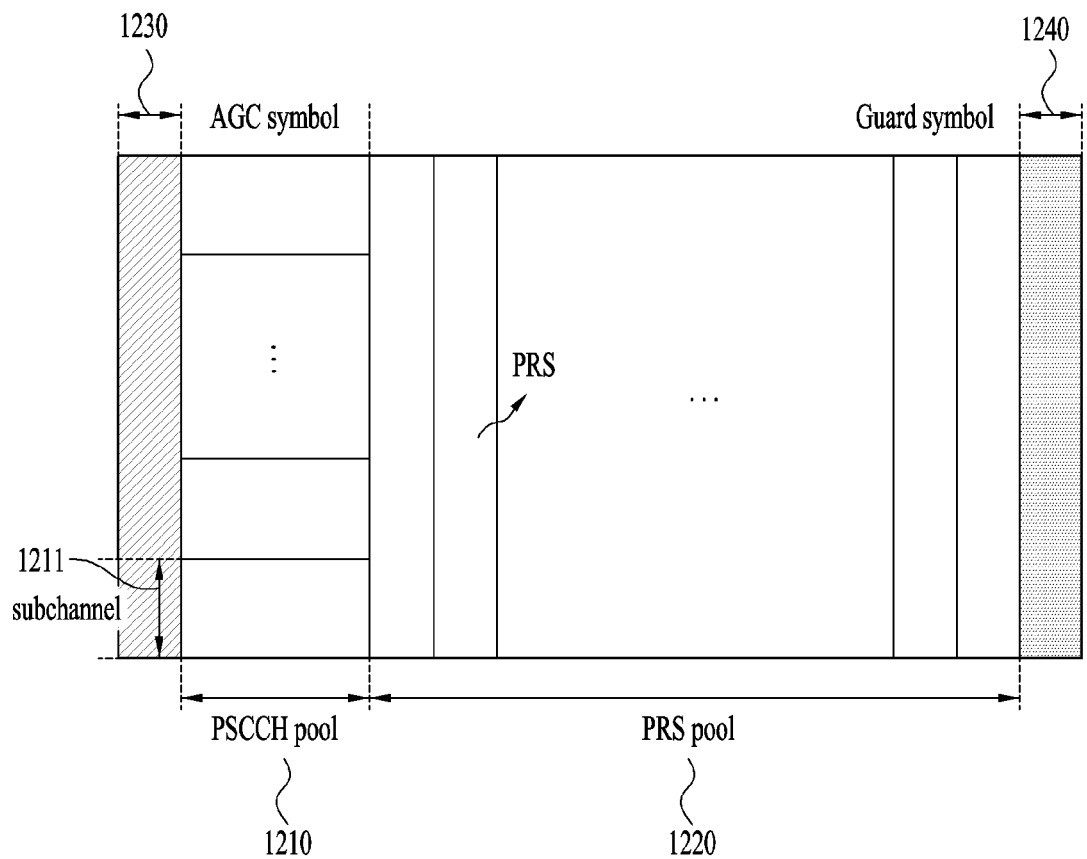

Referring to FIG. 5, the total frequency resources of a resource pool may be divided into NF frequency resources, and the total time resources of the resource pool may be divided into NT time resources. Thus, a total of NF*NT resource units may be defined in the resource pool. FIG. 13 illustrates an example in which the resource pool is repeated with a periodicity of NT subframes.

As illustrates in FIG. 5, one resource unit (e.g., Unit #0) may appear repeatedly with a periodicity. Alternatively, to achieve a diversity effect in the time or frequency domain, the index of a physical resource unit to which one logical resource unit is mapped may change over time in a predetermined pattern. In the resource unit structure, a resource pool may refer to a set of resource units available to a UE for transmission of an SL signal.

Resource pools may be divided into several types. For example, each resource pool may be classified as follows according to the content of an SL signal transmitted in the resource pool.

(1) A scheduling assignment (SA) may be a signal including information about the position of resources used for a transmitting UE to transmit an SL data channel, a modulation and coding scheme (MCS) or multiple input multiple output (MIMO) transmission scheme required for data channel demodulation, a timing advertisement (TA), and so on. The SA may be multiplexed with the SL data in the same resource unit, for transmission. In this case, an SA resource pool may refer to a resource pool in which an SA is multiplexed with SL data, for transmission. The SA may be referred to as an SL control channel.

(2) An SL data channel (PSSCH) may be a resource pool used for a transmitting UE to transmit user data. When an SA is multiplexed with SL data in the same resource unit, for transmission, only the SL data channel except for SA information may be transmitted in a resource pool for the SL data channel. In other words, REs used to transmit the SA information in an individual resource unit in an SA resource pool may still be used to transmit SL data in the resource pool of the SL data channel. For example, the transmitting UE may transmit the PSSCH by mapping the PSSCH to consecutive PRBs.

(3) A discovery channel may be a resource pool used for a transmitting UE to transmit information such as its ID. The transmitting UE may enable a neighboring UE to discover itself on the discovery channel.

Even when SL signals have the same contents as described above, different resource pools may be used according to the transmission/reception properties of the SL signals. For example, in spite of the same SL data channel or discovery message, a different resources pool may be used for an SL signal according to a transmission timing determination scheme for the SL signal (e.g., whether the SL signal is transmitted at a reception time of a synchronization reference signal (RS) or at a time resulting from applying a predetermined TA to the reception time), a resource allocation scheme for the SL signal (e.g., whether a BS allocates transmission resources of an individual signal to an individual transmitting UE or whether the individual transmitting UE selects its own individual signal transmission resources in the resource pool), the signal format of the SL signal (e.g., the number of symbols occupied by each SL signal in one subframe, or the number of subframes used for transmission of one SL signal), the strength of a signal from the BS, the transmission power of the SL UE, and so on.

SCI will be described below.

While control information transmitted from a BS to a UE on a PDCCH is referred to as DCI, control information transmitted from one UE to another UE on a PSCCH may be referred to as SCI. For example, the UE may know the starting symbol of the PSCCH and/or the number of symbols in the PSCCH before decoding the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) on the PSCCH and/or PSSCH to the receiving UE. The receiving UE may decode the two consecutive SCIs (e.g., 2-stage SCI) to receive the PSSCH from the transmitting UE. For example, when SCI configuration fields are divided into two groups in consideration of a (relatively) large SCI payload size, SCI including a first SCI configuration field group is referred to as first SCI. SCI including a second SCI configuration field group may be referred to as second SCI. For example, the transmitting UE may transmit the first SCI to the receiving UE on the PSCCH. For example, the transmitting UE may transmit the second SCI to the receiving UE on the PSCCH and/or PSSCH. For example, the second SCI may be transmitted to the receiving UE on an (independent) PSCCH or on a PSSCH in which the second SCI is piggybacked to data. For example, the two consecutive SCIs may be applied to different transmissions (e.g., unicast, broadcast, or groupcast).

For example, the transmitting UE may transmit all or part of the following information to the receiving UE by SCI. For example, the transmitting UE may transmit all or part of the following information to the receiving UE by first SCI and/or second SCI.

PSSCH-related and/or PSCCH-related resource allocation information, for example, the positions/number of time/frequency resources, resource reservation information (e.g. a periodicity), and/or an SL channel state information (CSI) report request indicator or SL (L1) RSRP (and/or SL (L1) reference signal received quality (RSRQ) and/or SL (L1) received signal strength indicator (RSSI)) report request indicator, and/or an SL CSI transmission indicator (on PSSCH) (or SL (L1) RSRP (and/or SL (L1) RSRQ and/or SL (L1) RSSI) information transmission indicator), and/or MCS information, and/or transmission power information, and/or L1 destination ID information and/or L1 source ID information, and/or SL HARQ process ID information, and/or new data indicator (NDI) information, and/or redundancy version (RV) information, and/or QoS information (related to transmission traffic/packet), for example, priority information, and/or An SL CSI-RS transmission indicator or information about the number of SL CSI-RS antenna ports (to be transmitted);

Location information about a transmitting UE or location (or distance area) information about a target receiving UE (requested to transmit an SL HARQ feedback), and/or RS (e.g., DMRS or the like) information related to decoding and/or channel estimation of data transmitted on a PSSCH, for example, information related to a pattern of (time-frequency) mapping resources of the DMRS, rank information, and antenna port index information.

For example, the first SCI may include information related to channel sensing. For example, the receiving UE may decode the second SCI using the PSSCH DMRS. A polar code used for the PDCCH may be applied to the second SCI. For example, the payload size of the first SCI may be equal for unicast, groupcast and broadcast in a resource pool. After decoding the first SCI, the receiving UE does not need to perform blind decoding on the second SCI. For example, the first SCI may include scheduling information about the second SCI.

In various embodiments of the present disclosure, since the transmitting UE may transmit at least one of the SCI, the first SCI, or the second SCI to the receiving UE on the PSCCH, the PSCCH may be replaced with at least one of the SCI, the first SCI, or the second SC. Additionally or alternatively, for example, the SCI may be replaced with at least one of the PSCCH, the first SCI, or the second SCI. Additionally or alternatively, for example, since the transmitting UE may transmit the second SCI to the receiving UE on the PSSCH, the PSSCH may be replaced with the second SCI.

Figure 6:
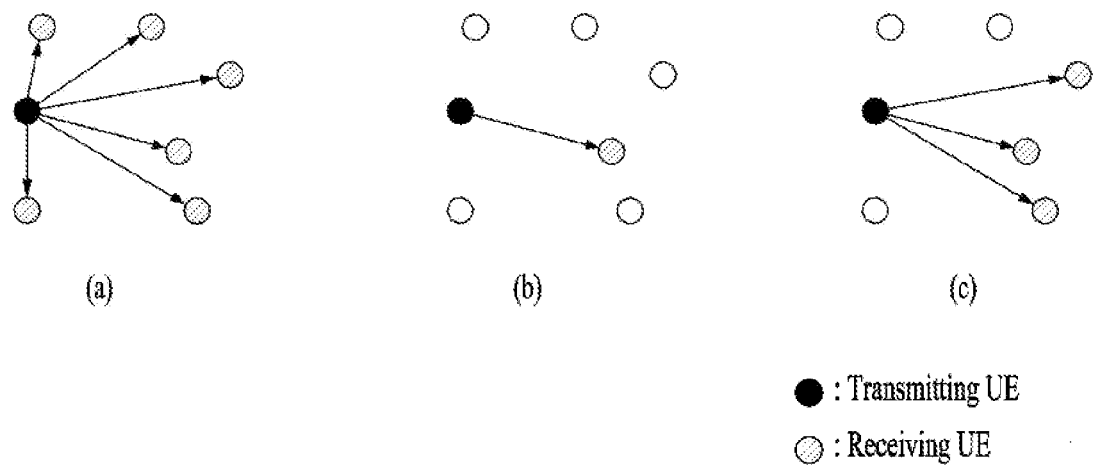
FIG. 6 is a diagram illustrating three cast types according to an embodiment of the present disclosure.

FIG. 6 illustrates three cast types according to an embodiment of the present disclosure.

Specifically, FIG. 6(a) illustrates broadcast-type SL communication, FIG. 6(b) illustrates unicast-type SL communication, and FIG. 6(c) illustrates groupcast-type SL communication. In unicast-type SL communication, a UE may perform one-to-one communication with another UE. In groupcast-type SL communication, the UE may perform SL communication with one or more UEs of a group to which the UE belongs. In various embodiments of the present disclosure, SL groupcast communication may be replaced with SL multicast communication, SL one-to-many communication, and so on.

Now, a description will be given of positioning.

Figure 7:
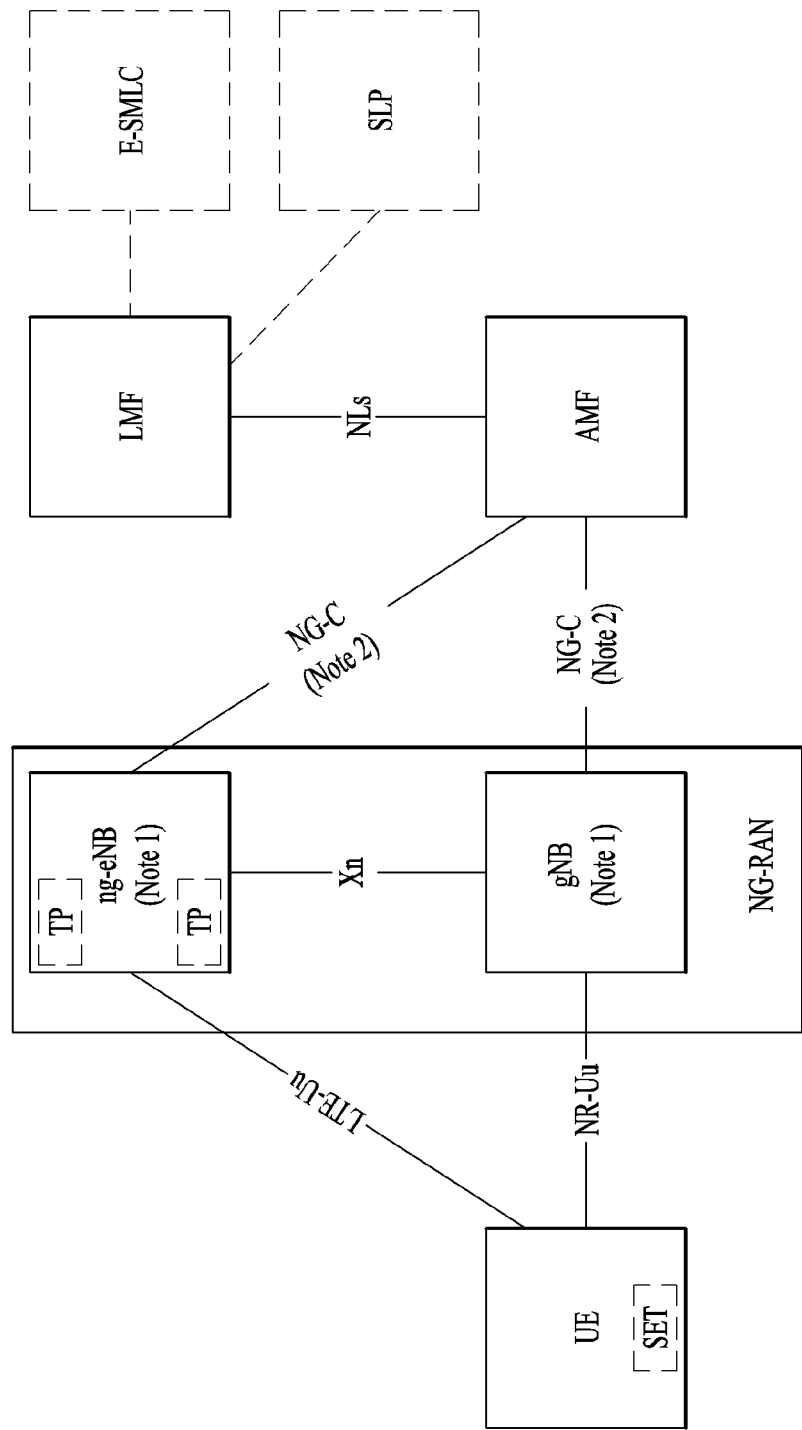
FIG. 7 is a diagram illustrating an exemplary architecture in a 5G system, for positioning a UE which has accessed an NG-RAN or an evolved UMTS terrestrial radio access network (E-UTRAN) according to an embodiment of the present disclosure.

FIG. 7 illustrates an exemplary architecture of a 5G system capable of positioning a UE connected to an NG-RAN or an E-UTRAN according to an embodiment of the present disclosure.

Referring to FIG. 7, an AMF may receive a request for a location service related to a specific target UE from another entity such as a gateway mobile location center (GMLC) or may autonomously determine to initiate the location service on behalf of the specific target UE. The AMF may then transmit a location service request to a location management function (LMF). Upon receipt of the location service request, the LMF may process the location service request and return a processing result including information about an estimated location of the UE to the AMF. On the other hand, when the location service request is received from another entity such as the GMLC, the AMF may deliver the processing result received from the LMF to the other entity.

A new generation evolved-NB (ng-eNB) and a gNB, which are network elements of an NG-RAN capable of providing measurement results for positioning, may measure radio signals for the target UE and transmit result values to the LMF. The ng-eNB may also control some transmission points (TPs) such as remote radio heads or positioning reference signal (PRS)-dedicated TPs supporting a PRS-based beacon system for E-UTRA.

The LMF is connected to an enhanced serving mobile location center (E-SMLC), and the E-SMLC may enable the LMF to access an E-UTRAN. For example, the E-SMLC may enable the LMF to support observed time difference of arrival (OTDOA), which is one of positioning methods in the E-UTRAN, by using DL measurements obtained by the target UE through signals transmitted by the eNB and/or the PRS-dedicated TPs in the E-UTRAN.

The LMF may be connected to an SUPL location platform (SLP). The LMF may support and manage different location determination services for target UEs. The LMF may interact with the serving ng-eNB or serving gNB of a target UE to obtain a location measurement of the UE. For positioning the target UE, the LMF may determine a positioning method based on a location service (LCS) client type, a QoS requirement, UE positioning capabilities, gNB positioning capabilities, and ng-eNB positioning capabilities, and apply the positioning method to the serving gNB and/or the serving ng-eNB. The LMF may determine additional information such as a location estimate for the target UE and the accuracy of the position estimation and a speed. The SLP is a secure user plane location (SUPL) entity responsible for positioning through the user plane.

The UE may measure a DL signal through sources such as the NG-RAN and E-UTRAN, different global navigation satellite systems (GNSSes), a terrestrial beacon system (TBS), a wireless local area network (WLAN) access point, a Bluetooth beacon, and a UE barometric pressure sensor. The UE may include an LCS application and access the LCS application through communication with a network to which the UE is connected or through another application included in the UE. The LCS application may include a measurement and calculation function required to determine the location of the UE. For example, the UE may include an independent positioning function such as a global positioning system (GPS) and report the location of the UE independently of an NG-RAN transmission. The independently obtained positioning information may be utilized as auxiliary information of positioning information obtained from the network.

Figure 8:
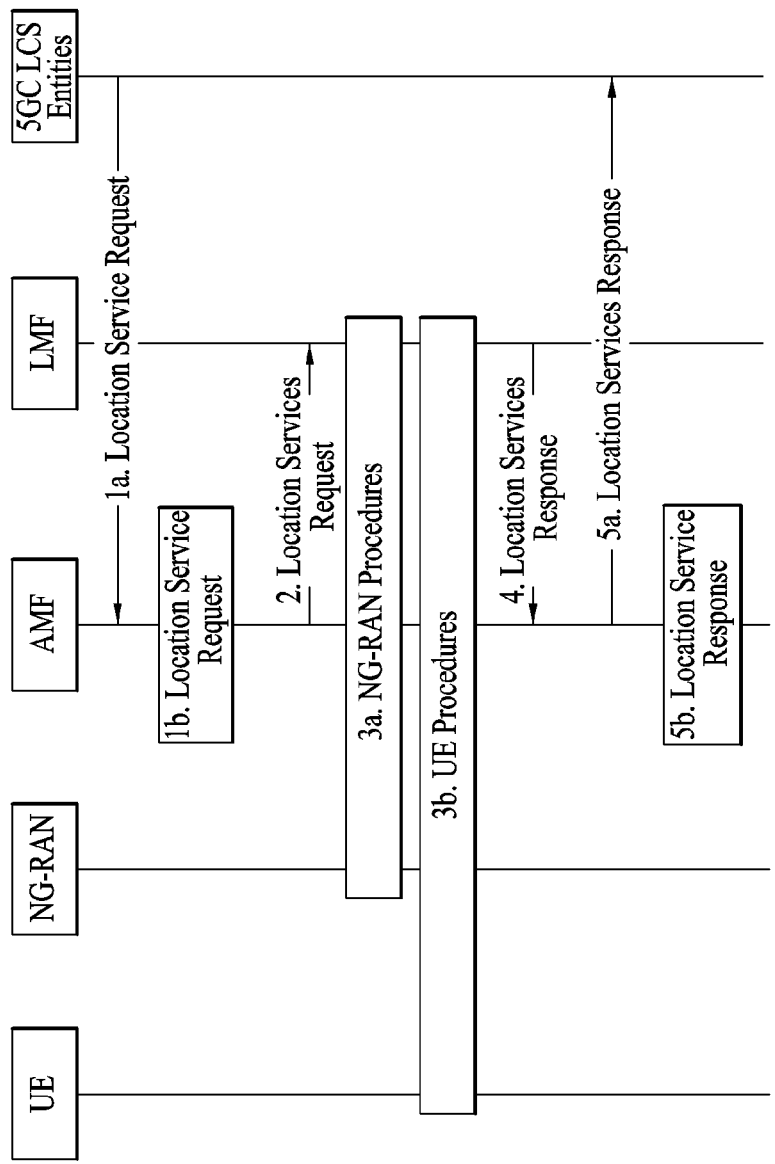
FIG. 8 is a diagram illustrating an implementation example of a network for positioning a UE according to an embodiment of the present disclosure.

FIG. 8 illustrates an exemplary implementation of a network for positioning a UE according to an embodiment of the present disclosure.

Upon receipt of a location service request when the UE is in a connection management-IDLE (CM-IDLE) state, the AMF may establish a signaling connection with the UE and request a network trigger service to assign a specific serving gNB or ng-eNB. This operation is not shown in FIG. 8. That is, FIG. 8 may be based on the assumption that the UE is in connected mode. However, the signaling connection may be released by the NG-RAN due to signaling and data deactivation during positioning.

Referring to FIG. 8, a network operation for positioning a UE will be described in detail. In step 1a, a 5GC entity such as a GMLC may request a location service for positioning a target UE to a serving AMF. However, even though the GMLC does not request the location service, the serving AMF may determine that the location service for positioning the target UE is required in step 1b. For example, for positioning the UE for an emergency call, the serving AMF may determine to perform the location service directly.

The AMF may then transmit a location service request to an LMF in step 2, and the LMF may start location procedures with the serving-eNB and the serving gNB to obtain positioning data or positioning assistance data in step 3a. In addition, the LMF may initiate a location procedure for DL positioning with the UE in step 3b. For example, the LMF may transmit positioning assistance data (assistance data defined in 3GPP TS 36.355) to the UE, or obtain a location estimate or location measurement. Although step 3b may be additionally performed after step 3a, step 3b may be performed instead of step 3a.

In step 4, the LMF may provide a location service response to the AMF. The location service response may include information indicating whether location estimation of the UE was successful and the location estimate of the UE. Then, when the procedure of FIG. 8 is initiated in step 1a, the AMF may deliver the location service response to the 5GC entity such as the GMLC. When the procedure of FIG. 8 is initiated in step 1b, the AMF may use the location service response to provide the location service related to an emergency call or the like.

Figure 9:
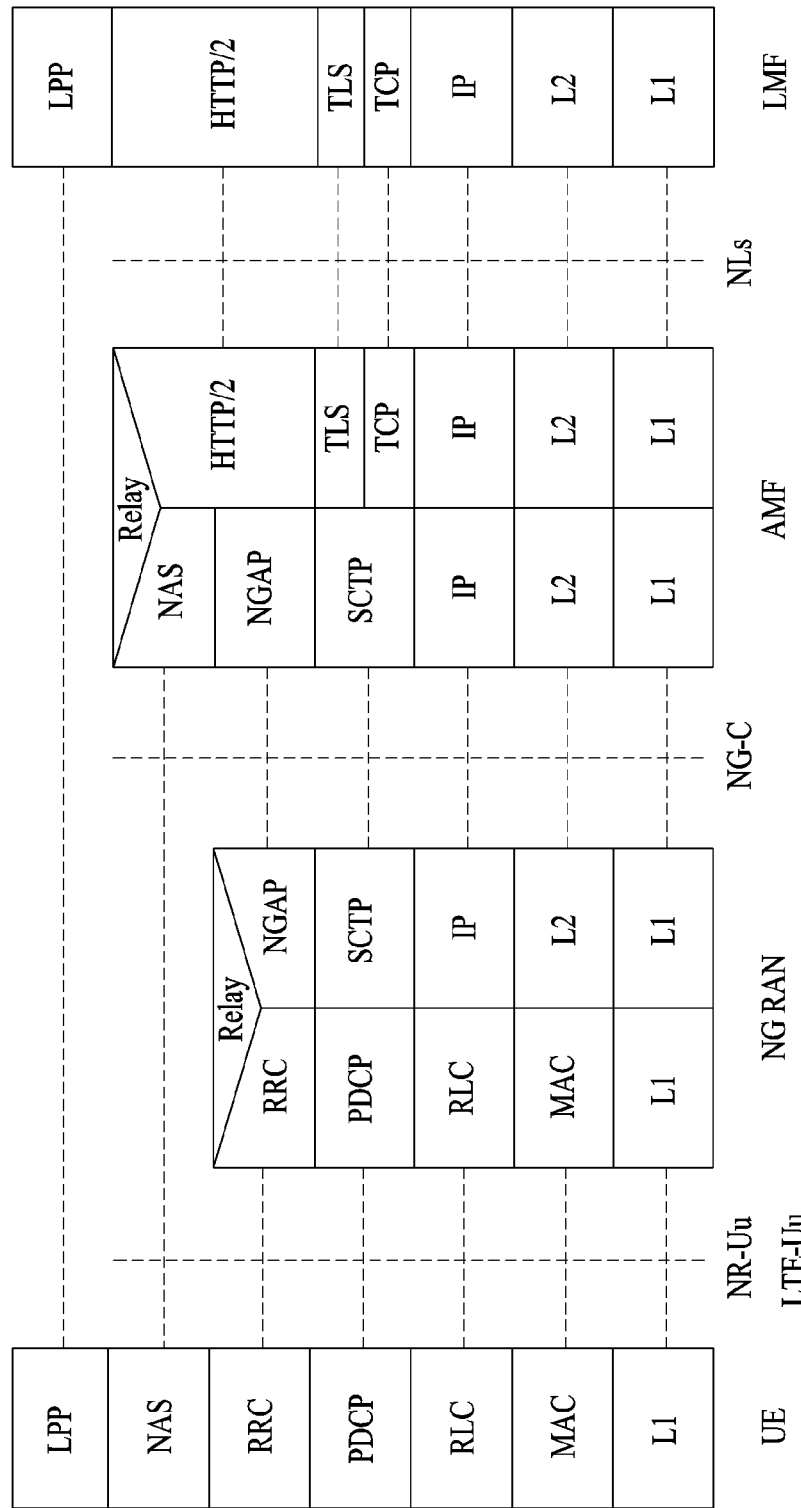
FIG. 9 illustrates exemplary protocol layers used to support LTE positioning protocol (LPP) message transmission between an LMF and a UE according to an embodiment of the present disclosure.

FIG. 9 illustrates exemplary protocol layers used to support LTE positioning protocol (LPP) message transmission between an LMF and a UE according to an embodiment of the present disclosure.

An LPP PDU may be transmitted in a NAS PDU between the AMF and the UE. Referring to FIG. 9, the LPP may be terminated between a target device (e.g., a UE in the control plane or a SUPL enabled UE (SET) in the user plane) and a location server (e.g., an LMF in the control plane or an SLP in the user plane). An LPP message may be transmitted in a transparent PDU over an intermediate network interface by using an appropriate protocol such as the NG application protocol (NGAP) via an NG-control plane (NG-C) interface or a NAS/RRC via LTE-Uu and NR-Uu interfaces. The LPP allows positioning for NR and LTE using various positioning methods.

For example, the target device and the location server may exchange capability information with each other, positioning assistance data and/or location information over the LPP. Further, error information may be exchanged and/or discontinuation of an LPP procedure may be indicated, by an LPP message.

Figure 10:
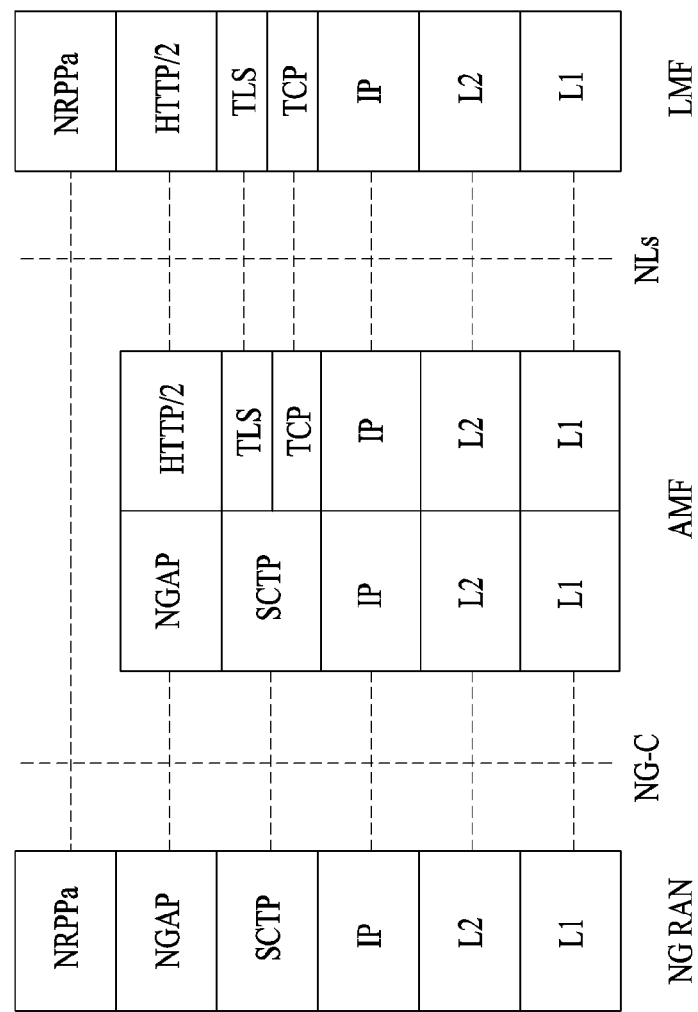
FIG. 10 illustrates exemplary protocol layers used to support NR positioning protocol A (NRPPa) PDU transmission between an LMF and an NG-RAN node according to an embodiment of the present disclosure.

FIG. 10 illustrates exemplary protocol layers used to support NR positioning protocol A (NRPPa) PDU transmission between an LMF and an NG-RAN node according to an embodiment of the present disclosure.

NRPPa may be used for information exchange between the NG-RAN node and the LMF. Specifically, NRPPa enables exchange of an enhanced-cell ID (E-CID) for a measurement transmitted from the ng-eNB to the LMF, data to support OTDOA positioning, and a Cell-ID and Cell location ID for NR Cell ID positioning. Even without information about a related NRPPa transaction, the AMF may route NRPPa PDUs based on the routing ID of the related LMF via an NG-C interface.

Procedures of the NRPPa protocol for positioning and data collection may be divided into two types. One of the two types is a UE-associated procedure for delivering information (e.g., positioning information) about a specific UE, and the other type is a non-UE-associated procedure for delivering information (e.g., gNB/ng-eNB/TP timing information) applicable to an NG-RAN node and related TPs. The two types of procedures may be supported independently or simultaneously.

Positioning methods supported by the NG-RAN include GNSS, OTDOA, E-CID, barometric pressure sensor positioning, WLAN positioning, Bluetooth positioning, terrestrial beacon system (TBS), and UL time difference of arrival (UTDOA). Although a UE may be positioned using any of the above positioning methods, two or more positioning methods may be used to position the UE.

(1) Observed Time Difference of Arrival (OTDOA)

Figure 11:
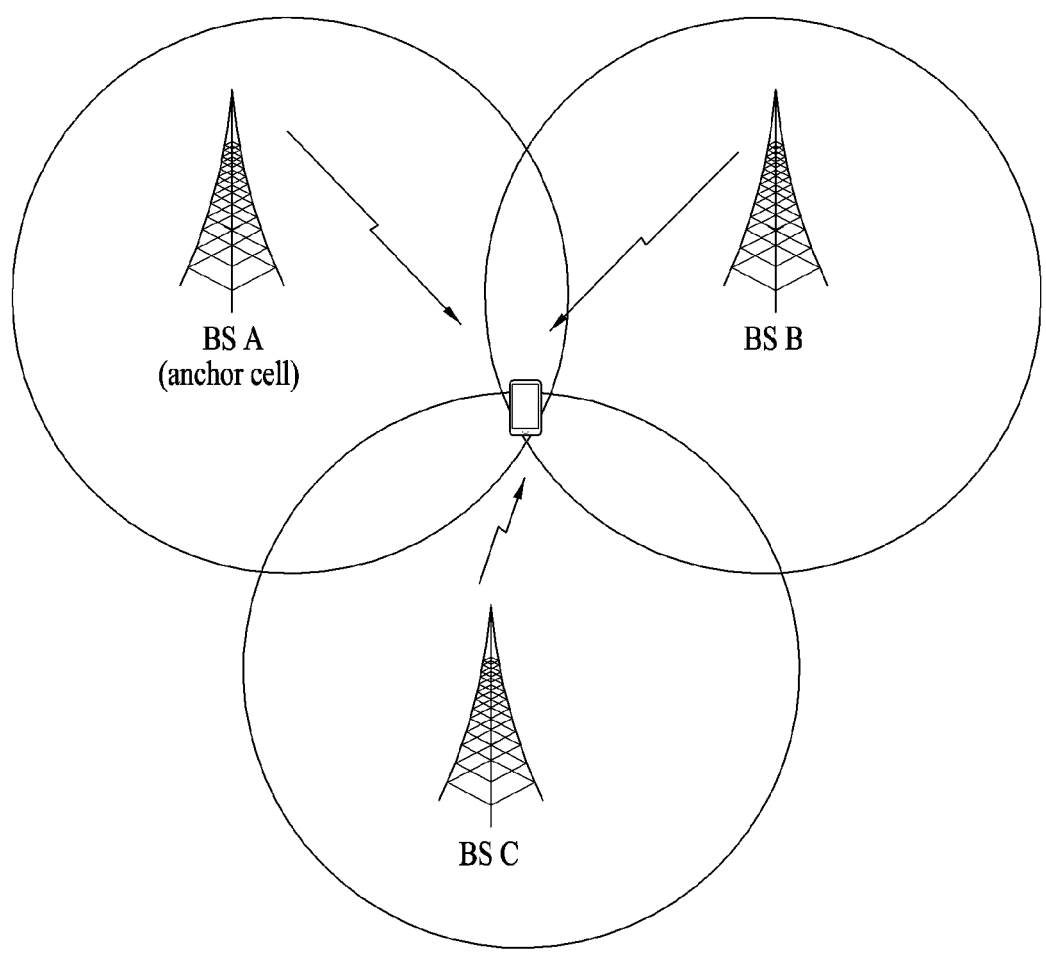
FIG. 11 is a diagram illustrating an OTDOA (Observed Time Difference Of Arrival) positioning method according to an embodiment of the present disclosure.

FIG. 11 is a diagram illustrating an OTDOA positioning method according to an embodiment of the present disclosure.

In the OTDOA positioning method, a UE utilizes measurement timings of DL signals received from multiple TPs including an eNB, an ng-eNB, and a PRS-dedicated TP. The UE measures the timings of the received DL signals using positioning assistance data received from a location server. The location of the UE may be determined based on the measurement results and the geographical coordinates of neighboring TPs.

A UE connected to a gNB may request a measurement gap for OTDOA measurement from a TP. When the UE fails to identify a single frequency network (SFN) for at least one TP in OTDOA assistance data, the UE may use an autonomous gap to acquire the SFN of an OTDOA reference cell before requesting a measurement gap in which a reference signal time difference (RSTD) is measured.

An RSTD may be defined based on a smallest relative time difference between the boundaries of two subframes received from a reference cell and a measurement cell. That is, the RSTD may be calculated as a relative timing difference between a time when the UE receives the start of a subframe from the reference cell and a time when the UE receives the start of a subframe from the measurement cell which is closest to the subframe received from the reference cell. The reference cell may be selected by the UE.

For accurate OTDOA measurement, it is necessary to measure the times of arrival (TOAs) of signals received from three or more geographically distributed TPs or BSs. For example, TOAs for TP 1, TP 2, and TP 3 may be measured, an RSTD for TP 1-TP 2, an RSTD for TP 2-TP 3, and an RSTD for TP 3-TP 1 may be calculated based on the three TOAs, geometric hyperbolas may be determined based on the calculated RSTDs, and a point where these hyperbolas intersect may be estimated as the location of the UE. Accuracy and/or uncertainty may be involved in each TOA measurement, and thus the estimated UE location may be known as a specific range according to the measurement uncertainty.

For example, an RSTD for two TPs may be calculated by Equation 1.

$$RSTDi, 1 = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1) \quad \text{[Equation 1]}$$

In Equation 1, 'c' is the speed of light, {xt, yt} is the (unknown) coordinates of the target UE, {xi, yi} is the coordinates of a (known) TP, and {x1, y1} is the coordinates of a reference TP (or another TP). (Ti–T1) is a transmission time offset between the two TPs, which may be referred to as "real time difference" (RTD), and 'ni' and 'n1' may represent values related to UE TOA measurement errors.

(2) E-CID (Enhanced Cell ID)

In cell ID (CID) positioning, the location of a UE may be measured based on geographic information about the serving ng-eNB, serving gNB and/or serving cell of the UE. For example, the geographic information about the serving ng-eNB, the serving gNB, and/or the serving cell may be obtained by paging, registration, and the like.

For E-CID positioning, an additional UE measurement and/or NG-RAN radio resources may be used to improve a UE location estimate in addition to the CID positioning method. In the E-CID positioning method, although some of the same measurement methods as in the measurement control system of the RRC protocol may be used, an additional measurement is generally not performed only for positioning the UE. In other words, a separate measurement configuration or measurement control message may not be provided to position the UE, and the UE may also report a measured value obtained by generally available measurement methods, without expecting that an additional measurement operation only for positioning will be requested.

For example, the serving gNB may implement the E-CID positioning method using an E-UTRA measurement received from the UE.

Exemplary measurement elements that are available for E-CID positioning are given as follows.

UE measurements: E-UTRA RSRP, E-UTRA RSRQ, UE E-UTRA RX-TX time difference, GSM EDGE random access network (GERAN)/WLAN RSSI, UTRAN common pilot channel (CPICH) received signal code power (RSCP), and UTRAN CPICH Ec/Io.

E-UTRAN measurements: ng-eNB RX-TX time difference, timing advance (TADV), and angle of arrival (AoA).

TADVs may be classified into Type 1 and Type 2 as follows.

TADV Type 1=(ng-eNB RX-TX time difference)+ (UE E-UTRA RX-TX time difference)

TADV Type 2=ng-eNB RX-TX time difference

On the other hand, an AoA may be used to measure the direction of the UE. The AoA may be defined as an estimated angle of the UE with respect to the location of the UE counterclockwise from a BS/TP. A geographical reference direction may be North. The BS/TP may use a UL signal such as a sounding reference signal (SRS) and/or a DMRS for AoA measurement. As the arrangement of antenna arrays is larger, the measurement accuracy of the AoA is higher. When the antenna arrays are arranged at the same interval, signals received at adjacent antenna elements may have a constant phase change (phase rotation).

(3) UTDOA (Uplink Time Difference of Arrival)

UTDOA is a method of determining the location of a UE by estimating the arrival time of an SRS. When the estimated SRS arrival time is calculated, a serving cell may be used as a reference cell to estimate the location of the UE based on the difference in arrival time from another cell (or BS/TP). In order to implement the UTDOA method, an E-SMLC may indicate the serving cell of a target UE to indicate SRS transmission to the target UE. Further, the E-SMLC may provide a configuration such as whether an SRS is periodic/aperiodic, a bandwidth, and frequency/group/sequence hopping.

EMBODIMENT

The present disclosure relates to a groupcast positioning operation of a UE using sidelink in an NR-V2X system. Groupcast positioning described in the present disclosure means a method in which a positioning UE that desires to perform positioning requests neighboring candidate anchor nodes (ANs) to provide information necessary for positioning and to participate in a positioning process and performs positioning with the help from an group that has finally accepted participation in groupcast positioning.

Figure 12:
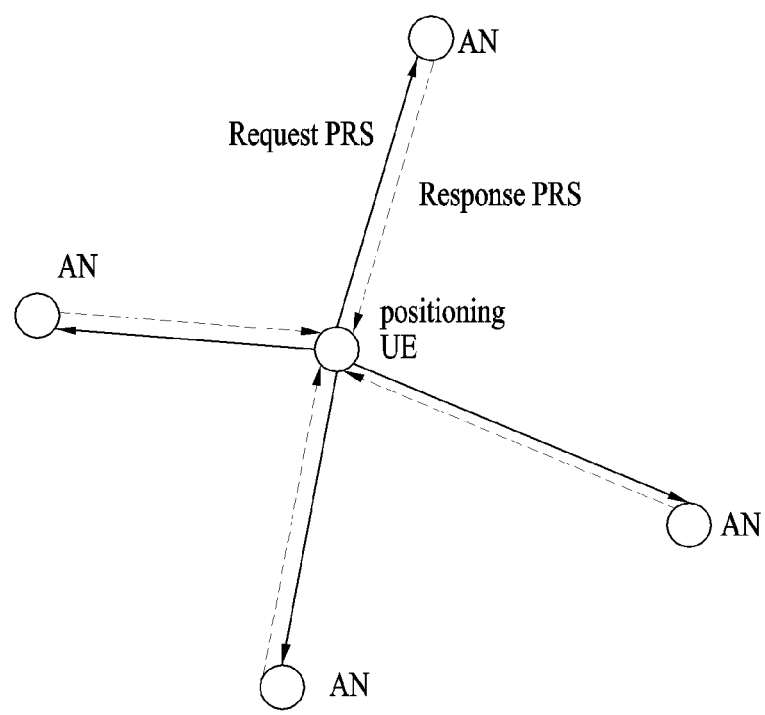
FIGS. 12 to 19 are diagrams for explaining embodiment(s)

FIG. 12 is a diagram for explaining a groupcast positioning operation proposed in the present disclosure.

Referring to FIG. 12, the positioning UE may transmit a request positioning reference signal (PRS) to ANs that participate in the groupcast positioning operation. That is, the positioning UE may request information necessary for positioning by transmitting a reference signal having a specific pattern (request PRS) to the ANs. The ANs may transmit response PRSs in response to the request PRS to the positioning UE.

In other words, in the present disclosure, for time of arrival (ToA) measurement between the positioning UE and the ANs that have accepted positioning participation, the positioning UE may transmit the request PRS and the ANs may transmit the response PRSs to the positioning UE in response to the request PRS.

These request PRS and response PRSs may be transmitted in various slot structures and may be transmitted in various scenarios. For example, positioning UEs may use the same request PRS pattern, ANs in an group may use the same response PRS pattern, or AN groups may use non-orthogonal response PRS patterns.

The present disclosure also proposes preconfigured PRS (P-PRS) scheduling and flexible PRS (F-PRS) scheduling methods capable of effectively controlling collision between PRSs that may arise in the groupcast positioning operation.

The present disclosure relates to a method in which the UE and the ANs measure the location of the UE through sidelink in the NR-V2X system. Specifically, the present disclosure relates to a method in which the UE performs positioning by receiving information necessary for positioning from the ANs.

Here, the UE may be a mobile device, a V2X module, or an IoT device, and the AN may be a BS and/or a UE. The BS as the AN may include an eNB, a gNB, LTE licensed-assisted access (LAA), NR-unlicensed (U), a transmission point (TP), remote head control (RHC), and a gNB-type road side unit (RSU) that may provide fixed (or absolute) location information. The UE as the AN may include a UE that may provide highly-reliable location information and a UE-type RSU that may provide fixed location information.

Hereinafter, problems of the prior art related to the present disclosure will be described.

In general, an observed time difference of arrival (OT-DoA) positioning operation in the NR system largely includes 1) a process of transmitting a PRS by the BS to the UE, and 2) a process of reporting a reference signal time difference (RSTD) by the UE to a location server/LMF and/or the BS. In this case, when a plurality of BSs participates in OTDoA positioning, the BSs may simultaneously transmit PRSs using different PRS patterns. However, when PRS patterns that may be simultaneously used are limited, collision between PRSs is inevitable and, instead, collision may be minimized through appropriate PRS scheduling.

The PRS scheduling method applied to NR OTDoA positioning includes 1) sequentially defining available PRS patterns and 2) selecting a PRS pattern of the same order as a result value obtained by applying module operation to a unique cell ID assigned to the BS. This PRS scheduling method may cause collision between PRSs regardless of the limited number of PRS patterns if module operation results for cell IDs are equal.

This problem may be solved using a PRS muting technique. For example, if the module operation results for the cell ID are equal, while one BS transmits a PRS, other BSs may transmit zero-powered PRSs, thereby minimizing damage caused by collision between PRSs. This PRS muting method is effective in a location server/LMF-based positioning operation but is not suitable for a UE-based positioning operation (e.g., a sidelink positioning operation) performed without the help of the location server/LMF and/or the BS.

Hereinafter, proposals of the present disclosure will be described.

The present disclosure relates to a PRS scheduling method capable of effectively controlling collision between PRSs that may occur due to using the same request PRS pattern between positioning UEs (or between UEs performing positioning), using non-orthogonal response patterns between AN groups, or using the same response PRS pattern between ANs in an AN group, in the groupcast positioning operation of a UE using sidelink.

Hereinbelow, a description will be given in consideration of various slot structures in which a positioning UE transmits a request PRS to an AN group and the AN group transmits a response PRS to the positioning UE in response to the request PRS.

The request PRS and the response PRS may be transmitted in a normal NR-V2X slot and in a PRS slot as well. The PRS slot refers to a PRS dedicated slot used for PRS transmission in sidelink communication.

FIG. 13 is a diagram for explaining the structure of a PRS slot.

The PRS slot may be variously referred to as a PRS dedicated slot, a positioning slot, or a TDoA slot.

Referring to FIG. 13, the PRS slot may include a physical sidelink control channel (PSCCH) pool 1210, a PRS pool 1220, an automatic gain control (AGC) symbol 1230, and a guard symbol 1240. The PSCCH pool 1210 may include a plurality of subchannels 1211. Each of the subchannels may be allocated to a different UE.

The PRS pool 1220 may include a plurality of PRS patterns. Each UE or AN may use a different PRS pattern.

For example, the positioning UE may reserve a resource to be used by sensing a subchannel in the PSCCH pool. Each subchannel may be mapped to a specific PRS resource and pattern in the PRS pool. Accordingly, the UE may transmit the sensed and reserved subchannel and a PRS associated therewith.

The PSCCH pool and the PRS pool associated therewith may be transmitted in the same slot or different slots.

Hereinafter, various slot structure scenarios used in a request PRS and a response PRS will be described.

—Groupcast Positioning Slot Structure-1:

The request PRS of the positioning UE may be transmitted through an NR-V2X slot, and the response PRS of the AN group (or each AN) may be transmitted through a PRS slot. In this case, the PRS slot allows PSCCH transmission including scheduling information and PRS reservation information, for request PRSs between positioning UEs and response PRSs between AN groups.

—Groupcast Positioning Slot Structure-2:

Similar to Groupcast positioning slot structure-1, the request PRS of the positioning UE may be transmitted through the NR-V2X slot, and the response PRS of the AN group (or each AN) may be transmitted through the PRS slot. In this case, the scheduling information and the PRS reservation information, for request PRSs between positioning UEs and response PRSs between AN groups, may be transmitted through a PSCCH of the NR-V2X slot.

—Groupcast Positioning Slot Structure-3:

Unlike Groupcast positioning slot structures-1 and 2, the request PRS of the positioning UE may be transmitted through the PRS slot, and the response PRS of the AN group may also be transmitted through the PRS slot. In this case, the PRS slot allows PSCCH transmission including the scheduling information and PRS reservation, for request PRSs between positioning UEs and response PRSs between AN groups.

Groupcast Positioning Slot Structure-4:

Similar to Groupcast positioning slot structure-3, the request PRS of the positioning UE and the response PRS of the AN group may be transmitted through the PRS slot. In this case, the scheduling information and the PRS reservation information, for request PRSs between UEs and response PRSs between AN groups, may be transmitted through a PSCCH of the NR-V2X slot.

Table 5 is a table summarizing the above-described groupcast positioning slot structures.

TABLE 5

| Groupcast positioning slot structure | Request PRS | Response PRS | PRS scheduling information etc. |
|---|---|---|---|
| 1 | NR-V2X slot | PRS slot | PRS slot |
| 2 | NR-V2X slot | PRS slot | NR-V2X slot |
| 3 | PRS slot | PRS slot | PRS slot |
| 4 | PRS slot | PRS slot | NR-V2X slot |

Hereinafter, a procedure for sidelink groupcast positioning according to the above-described four groupcast positioning slot structures will be proposed. Here, groupcast positioning means a method in which a positioning UE that desires to perform positioning requests neighboring candidate ANs to provide information necessary for positioning and to participate in a positioning process and performs positioning with the help of an AN group that has finally accepted groupcast positioning participation.

[Embodiment-1] PRS Scheduling Methods Considering Groupcast Slot structure-1

Main features of Groupcast positioning slot structure-1 will now be described prior to describing the procedure for sidelink groupcast positioning.

Figure 14:
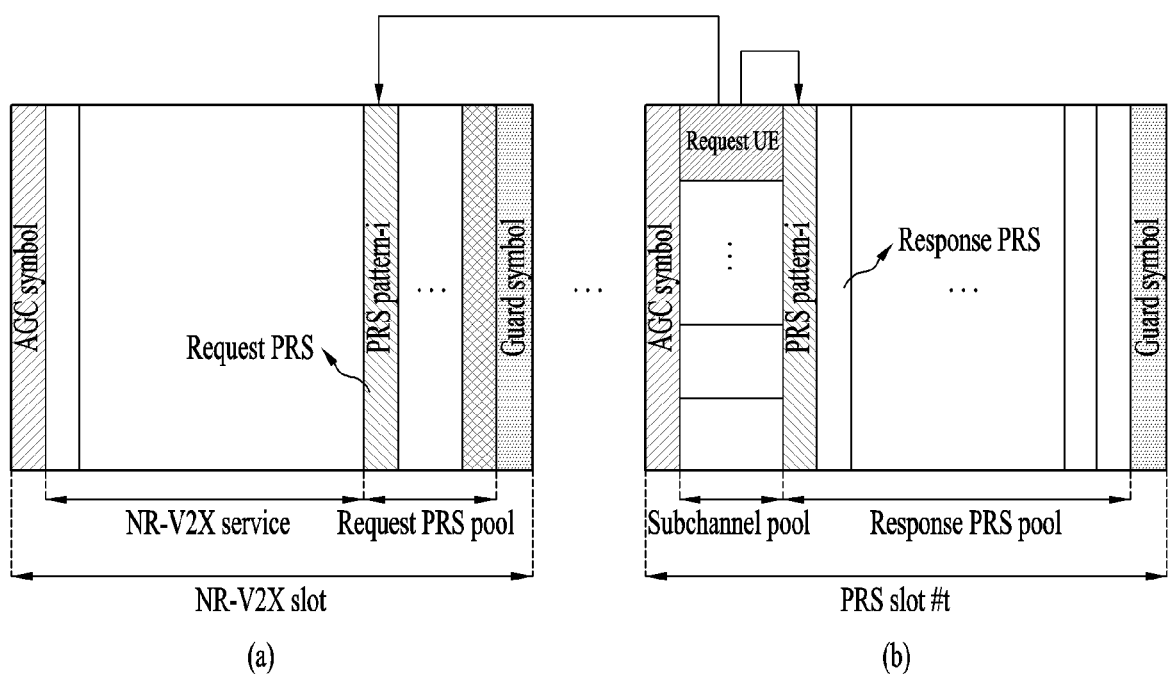

FIG. 14 illustrates a PRS scheduling method using Groupcast positioning slot structure-1, and main structural features and operation methods related to a groupcast positioning operation are as follows.

—Features and Operation Methods of Groupcast Positioning Slot Structure-1:

Referring to (a) of FIG. 14, the positioning UE may transmit a request PRS using a request PRS pool resource of an NR-V2X slot. The NR-V2X slot may include an NR-V2X service and a request PRS pool, and the request PRS pool resource may be configured using an SRS pool resource of existing NR UL. The request PRS pool may be operated by being included in the NR-V2X slot that is immediately adjacent to a PRS slot or located within a predetermined slot duration based on the PRS slot.

Referring to (b) of FIG. 14, an AN group may transmit a response PRS using a response PRS pool resource of the PRS slot in response to the request PRS received from the positioning UE. In this case, the PRS slot is a slot inserted into the NR-V2X system and may be composed of a subchannel pool and a response PRS pool. The subchannel may be located in front of the response PRS pool and may be composed of a plurality of RBs. Frequency bandwidth of the response PRS may be allocated through a plurality of RB configurations, and (b) of FIG. 14 illustrates an embodiment in which one response PRS is transmitted through the entire effective frequency bandwidth.

The positioning UE may transmit, through the subchannel pool of the PRS slot, a PSCCH and/or a physical sidelink shared channel (PSSCH) including scheduling information for the request PRS, scheduling information for the response PRS related to the AN group, and reservation information for the request/response PRS. In this case, each subchannel may include information related to one positioning UE and an AN group participating in groupcast positioning. In other words, the positioning UE may sense and reserve a subchannel in the PRS slot and transmit the scheduling information for the request PRS, the scheduling information for the response PRS, and the like to the AN group on a reserved subchannel resource.

Each AN of the AN group may transmit a measured time of arrival (ToA) and a transmission (TX)-reception (RX) time difference (TRTD) through a PSSCH of the NR-V2X slot.

Next, P-PRS scheduling and F-PRS scheduling proposed as the above-described PRS scheduling method considering Groupcast positioning slot structure-1 will be described. In this case, PRS scheduling may include 1) request PRS scheduling between positioning UEs, 2) response PRS scheduling between AN groups, and 3) response PRS scheduling between ANs within an AN group.

P-PRS Scheduling

Proposed P-PRS scheduling is a method of quickly selecting and reserving the request PRS and the response PRS by preconfiguring one-to-many correspondence between one request PRS and a plurality of response PRSs. That is, when the positioning UE selects an arbitrary request PRS from the request PRS pool, a plurality of response PRSs for the AN group are automatically selected according to preconfiguration. Such P-PRS scheduling does not require additional response PRS scheduling for the AN group except for request PRS scheduling between positioning UEs, and thus signaling overhead related to PRS scheduling may be reduced.

P-PRS scheduling may preconfigure one-to-one correspondence between one request PRS and one subchannel. That is, if the positioning UE selects an arbitrary subchannel from the subchannel pool, the request PRS for the positioning UE may be automatically selected according to preconfiguration, and a plurality of response PRSs for the AN group may also be automatically selected according to preconfiguration.

In other words, the positioning UE may sense and select an arbitrary subchannel in the subchannel within the PRS slot and transmit the request PRS corresponding to the selected subchannel. In addition, a plurality of response PRSs corresponding to the request PRS may be automatically selected according to preconfiguration.

Figure 15:
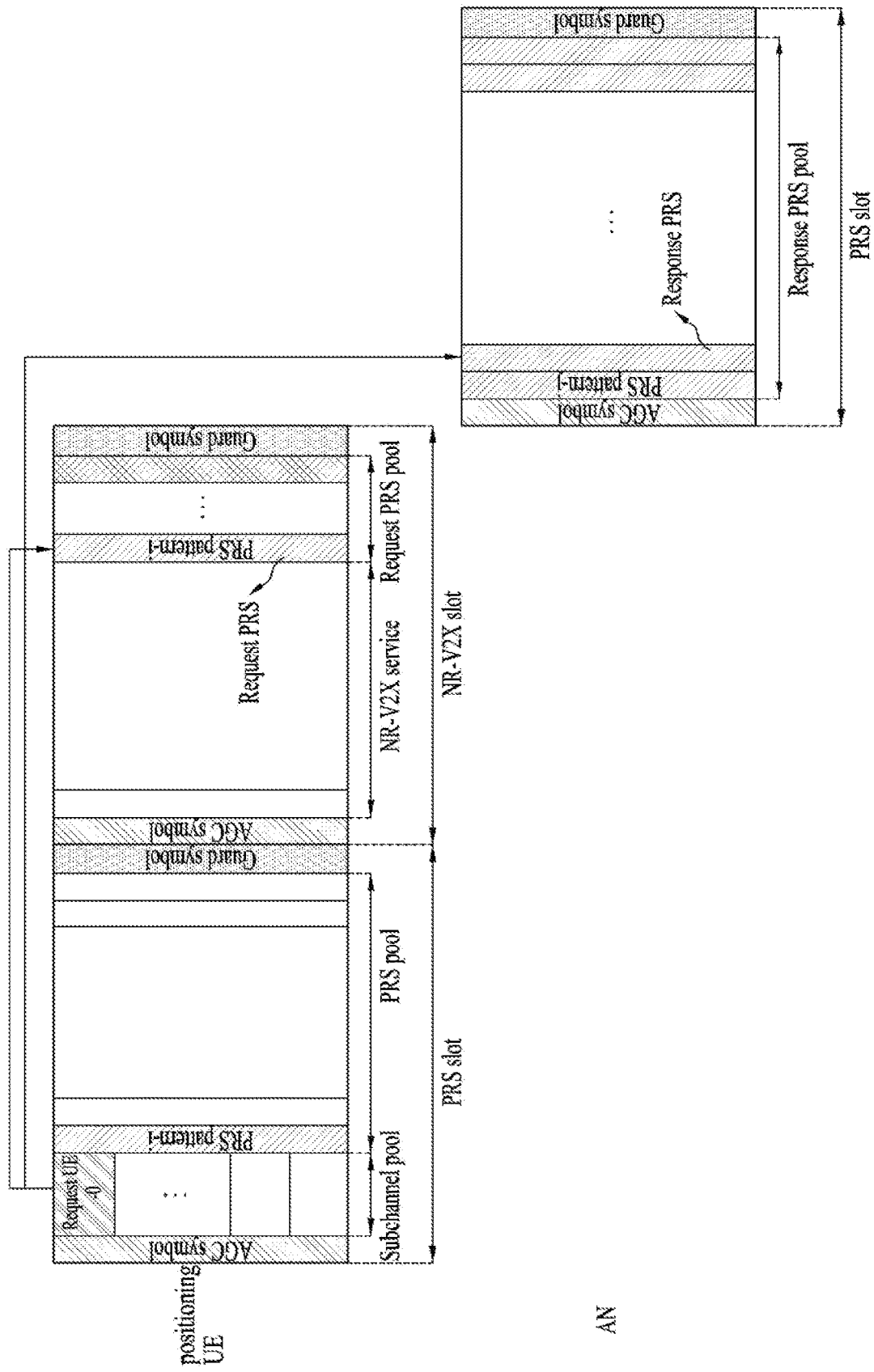

FIG. 15 is a diagram for explaining an embodiment of P-PRS scheduling considering Groupcast positioning slot structure-1.

Referring to FIG. 15, if the positioning UE selects the first subchannel by sensing a subchannel pool, a preconfigured request PRS and a preconfigured response PRS group associated with the first subchannel are automatically selected. The positioning UE may transmit the preconfigured request PRS to the AN, and the AN may use the preconfigured PRS pattern group.

Hereinafter, main P-PRS scheduling information preconfigured in each subchannel will be described.

The P-PRS scheduling information may include information about a request PRS pattern that the positioning UE may use and an OFDM symbol location for transmitting the request PRS in a request PRS pool.

A plurality of positioning UEs may transmit request PRSs using different request PRS patterns at the same OFDM symbol location.

In this case, a response PRS pattern group that is usable by one AN group and an OFDM symbol location for transmitting a response PRS group in a response PRS pool may be preconfigured.

The response PRS pattern group may include one or more response PRS patterns. The number of response PRS patterns of the response PRS pattern group may be predefined or may be determined by the location server/LMF and/or the BS and then be transmitted to the BS and the UE.

The response PRS patterns of the response PRS pattern group may be transmitted at the same OFDM symbol location of the response PRS pool or may be transmitted at different OFDM symbol locations of the response PRS pool.

The number of response PRS patterns that may be simultaneously transmitted in one OFDM symbol is greater than 1 and may be smaller than the maximum number of response PRS patterns that may be simultaneously transmitted.

Hereinafter, main features of P-PRS scheduling will be described.

A unique ID (subchannel-ID) is assigned to each subchannel constituting a subchannel pool, and a unique request PRS pattern is mapped to each subchannel-ID. In this case, as a method of mapping the unique request PRS pattern to the subchannel-ID, a unique request PRS-ID (or a request PRS number) may be allocated to each request PRS pattern and then the request PRS pattern is mapped to each subchannel-ID.

Tables 6 and 7 below show an embodiment of mapping between a subchannel-ID and a request PRS-ID. More specifically, Table 6 shows the request PRS-ID according to the combination of a comb type and a cyclic shift value, and Table 7 shows a mapping relationship between the request PRS-ID and the subchannel-ID.

It may be appreciated from Table 7 that request PRS-9 is mapped to subchannel-9, so that the positioning UE that has reserved subchannel-9 may transmit the request PRS using request PRS-9. In addition, an AN group corresponding to the positioning UE may transmit the response PRS using a response PRS pattern group corresponding to request PRS-9 which is predefined.

A response PRS pattern used by each AN of the AN group and an OFDM symbol location for transmitting the response PRS in a response PRS pool may be determined by the positioning UE.

The positioning UE may use one or more response PRS pattern groups by reserving one or more subchannels when the number of ANs participating in groupcast positioning is larger than the size of a response PRS pattern group.

F-PRS Scheduling:

Next, F-PRS scheduling, which is the second proposal, will be described. Unlike P-PRS scheduling described above, F-PRS scheduling does not preconfigure one-to-many correspondence between one request PRS and a plurality of response PRSs. Instead, the positioning UE may select and reserve a request PRS available in a request pool using information sensed from a subchannel pool and select and reserve a plurality of response PRSs available in a response pool for an AN group. The F-PRS scheduling method for reserving the request PRS and the plurality of response PRSs through such sensing requires request PRS scheduling and response PRS scheduling and increases signaling overhead but provides high flexibility in a change in the size of the AN group. Main F-PRS scheduling information predefined in each subchannel is described below.

The F-PRS scheduling information may include information about a request PRS pattern for the positioning UE and an OFDM symbol location for transmitting the request PRS in a request PRS pool.

TABLE 6

| Cyclic-shift | Comb type-0 | Comb type-1 | Comb type-2 | Comb type-3 |
|---|---|---|---|---|
| CS-0 | Request PRS-0 | Request PRS-1 | Request PRS-2 | Request PRS-3 |
| CS-1 | Request PRS-4 | Request PRS-5 | Request PRS-6 | Request PRS-7 |
| CS-2 | Request PRS-8 | Request PRS-9 | Request PRS-10 | Request PRS-11 |
| CS-3 | Request PRS-12 | Request PRS-13 | Request PRS-14 | Request PRS-15 |

TABLE 7

| Cyclic-shift | Comb type-0 | Comb type-1 | Comb type-2 | Comb type-3 |
|---|---|---|---|---|
| CS-0 | Subchannel-0 | Subchannel-1 | Subchannel-2 | Subchannel-3 |
| CS-1 | Subchannel-4 | Subchannel-5 | Subchannel-6 | Subchannel-7 |
| CS-2 | Subchannel-8 | Subchannel-9 | Subchannel-10 | Subchannel-11 |
| CS-3 | Subchannel-12 | Subchannel-13 | Subchannel-14 | Subchannel-15 |

In Table 6, it is assumed that an SRS is used as the request PRS. In this case, it is assumed that the SRS has four comb types that may be simultaneously transmitted, and each comb type generates four PRS patterns using different PRS cyclic shift (CS) values. As a result, the SRS may support a total of 16 different PRS patterns, and each PRS pattern may have a unique ID. In this case, the request PRS-ID mapped to each subchannel-ID may be predefined or may be determined by the location server/LMF and/or the BS.

The F-PRS scheduling information may include information about a response PRS pattern group for the AN group and an OFDM symbol location for transmitting a response PRS group in a response PRS pool.

As compared with P-PRS scheduling, for the F-PRS scheduling method, response PRS information used by the AN group should be provided.

Hereinafter, main features of F-PRS scheduling will be described.

The positioning UE may select the request PRS sequentially or randomly using a request PRS-ID that may be predefined for a request PRS pattern that is available during reservation of the request PRS. For example, if 8 different request PRS patterns are simultaneously transmitted based on one OFDM symbol, and if other positioning UEs are using or are planning to use request PRS-0 to request PRS-4, the positioning UE may sequentially select request PRS-5 or randomly select a request PRS-ID from effective request PRS-5 to request PRS-7. In addition, the positioning UE may sequentially or randomly select an OFDM symbol location from a request pool for transmitting the request PRS.

The positioning UE may reserve the response PRS for the AN group similar to the request PRS reservation method. That is, the positioning UE may select an available response PRS pattern sequentially or randomly using a response PRS-ID that may be predefined. The positioning UE may select an OFDM symbol location sequentially or randomly from a response pool for transmitting the response PRS.

A CS value may be determined in a request PRS pattern reservation process. In this case, the CS value may be determined as follows: 1) using a unique ID of the positioning UE, or 2) using an OFDM symbol location at which the request PRS is transmitted.

$$\text{CS value} = (\text{unique ID of positioning UE}) \bmod (\text{total number of CS values}) \quad 1)$$

$$\text{CS value} = (\text{transmission OFDM symbol location of request PRS}) \bmod (\text{total number of CS values}) \quad 2)$$

Hereinafter, a main positioning operation of a UE based on Groupcast positioning slot structure-1 will be described.

The positioning UE may transmit the request PRS to the AN group and record a transmission time.

Each AN of the AN group may record a reception time of the request PRS received from the positioning UE.

Each AN of the AN group may transmit the response PRS to the positioning UE and record a transmission time.

The positioning UE records a reception time of the response PRS received from the AN group and receives a ToA value or a TRTD value measured by each AN of the AN group through a PSSCH of an NR-V2X slot.

The positioning UE may perform groupcast positioning using information such as the transmission time of the request PRS by the positioning UE, the reception time of the request PRS by each AN, the transmission time of the response PRS by each AN, and the reception time of the response PRS by the positioning UE.

[Embodiment-2]: PRS Scheduling Methods Considering Groupcast Slot Structure-2

A PRS scheduling method using Groupcast positioning slot structure-2 similar to Groupcast positioning slot structure-1 described above will be described hereinbelow.

Figure 16:
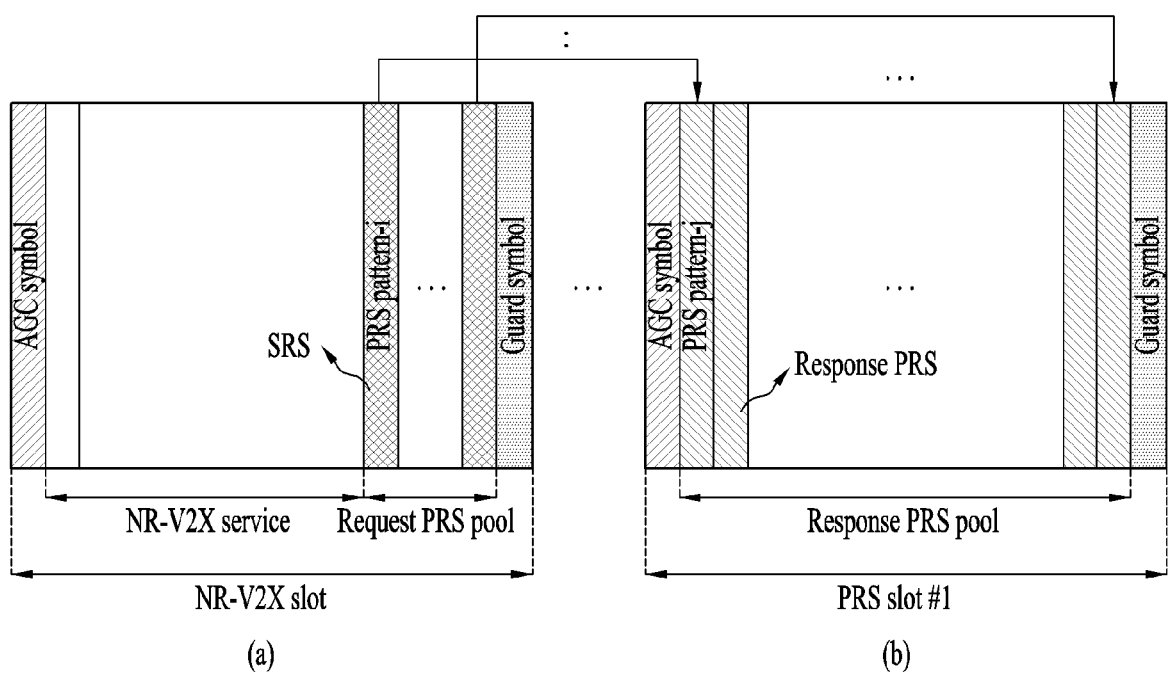

FIG. 16 illustrates Groupcast positioning slot structure-2. Main structural features and operation methods related to a groupcast positioning operation are as follows.

—Features and Operation Methods of Groupcast Positioning Slot Structure-2:

The UE may transmit a request PRS using a request PRS pool resource of an NR-V2X slot. Meanwhile, the AN group may transmit a response PRS using a response PRS pool resource of a PRS slot in response to the request PRS received from the UE. Each AN of the AN group may transmit a measured ToA value or TRTD value through a PSSCH of the NR-V2X slot.

The UE may transmit scheduling information for a PRS related thereto, scheduling information for a PRS related to the AN group, and reservation information related to the PRS through a PSCCH and/or the PSSCH of the NR-V2X slot.

Hereinafter, P-PRS scheduling and F-PRS scheduling considering Groupcast positioning slot structure-2 will be described. The proposed PRS scheduling method may have similar features to the PRS scheduling method of FIG. 14 described above, except for the PRS scheduling operation method through the subchannel pool in the PRS slot.

P-PRS Scheduling:

A method similar to the method described in the P-PRS scheduling method of FIG. 14 is applicable to P-PRS scheduling considering Groupcast positioning slot structure-2 of FIG. 16. More specifically, one-to-many correspondence between one request PRS and a plurality of response PRSs may be preconfigured, and one-to-one correspondence between one request PRS and one subchannel may be preconfigured. Therefore, fast PRS scheduling may be performed and signaling overhead may be reduced by applying the P-PRS scheduling method to Groupcast positioning slot structure-2.

On the other hand, PRS scheduling may be performed through the PSCCH and/or the PSSCH of the NR-V2X slot. PRS scheduling information included in the PSCCH and/or the PSSCH transmitted through the NR-V2X slot may be the same as the information described in P-PRS scheduling in Groupcast positioning slot structure-1. Main features related to P-PRS scheduling may be the same as the above-described main features described in P-PRS scheduling of Groupcast positioning slot structure-1 except for the PRS scheduling operation through the subchannel pool.

F-PRS Scheduling:

Hereinafter proposed F-PRS scheduling will be described. Unlike P-PRS scheduling described above, F-PRS scheduling may not preconfigure one-to-many correspondence between one request PRS and a plurality of response PRSs. More specifically, the positioning UE may select and reserve a request PRS available in a request pool by sensing the PSCCH and/or PSSCH transmitted through the NR-V2X slot and select and reserve a plurality of response PRSs available in a response pool for the AN group. In this case, reservation information may mainly include information about a request PRS pattern for the positioning UE and an OFDM symbol location for transmitting the request PRS in a request PRS pool and include information about a response PRS pattern group for the AN group and an OFDM symbol location for transmitting a response PRS group in a response PRS pool.

Main positioning operation of the UE based on Groupcast positioning slot structure-2 may be the same as the main positioning operation of the UE based on Group positioning slot structure-1.

[Embodiment-3]: PRS Scheduling Methods Considering Groupcast Slot Structure-3

Figure 17:
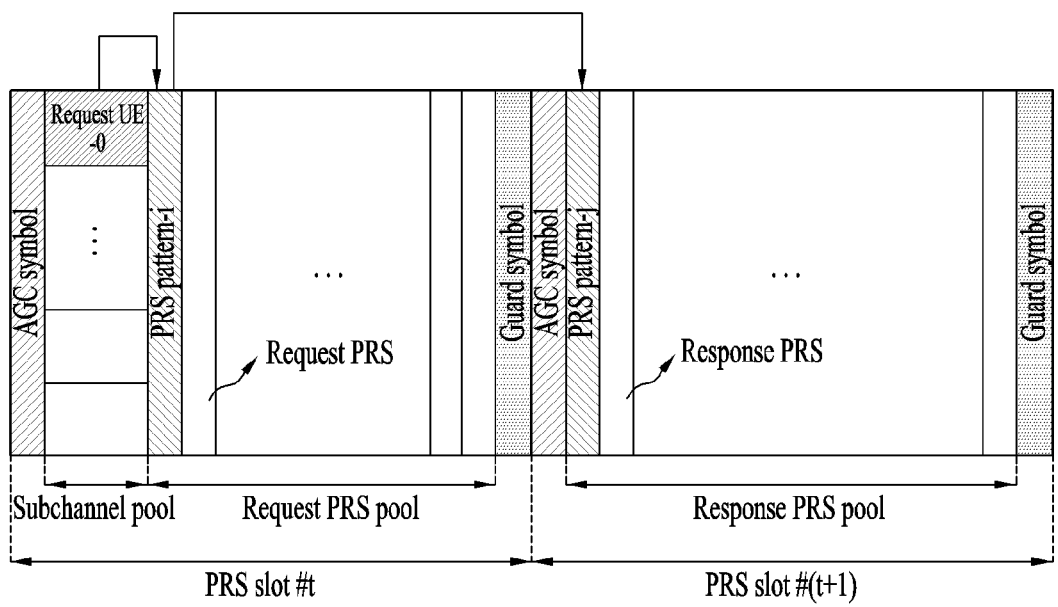

Hereinafter, a PRS scheduling method based on Groupcast positioning slot structure-3 will be described. FIG. 17 illustrates Groupcast positioning slot structure-3. Main structural features and operation methods related to a groupcast positioning operation are as follows.

—Features and Operation Methods of Groupcast Positioning Slot Structure-3:

The positioning UE may transmit a request PRS using a request PRS pool resource of a PRS slot. In this case, the PRS slot is a slot inserted into the NR-V2X system, including a subchannel pool and a request PRS pool. Here, a subchannel may be located in front of a request PRS pool and may consist of a plurality of RBs. Frequency bandwidth of the request PRS may be allocated through a plurality of RB configurations. FIG. 17 illustrates an embodiment in which one request PRS is transmitted through the entire effective frequency bandwidth.

The AN group may transmit a response PRS using a response PRS pool resource of the PRS slot in response to the request PRS received from the positioning UE. In this case, the frequency bandwidth of the request PRS may be allocated through a plurality of RB configurations. FIG. 17 illustrates an embodiment in which one request PRS is transmitted through the entire effective frequency bandwidth.

The positioning UE transmits a PSCCH and/or a PSSCH including scheduling information for the request PRS, scheduling information for the response PRS related to the AN group, and reservation information for the request/response PRS through the subchannel pool of the PRS slot. In this case, each subchannel may include information related to one UE and an AN group participating in groupcast positioning.

Each AN of the AN group may transmit a measured ToA or TRTD value through the PSSCH of the NR-V2X slot.

A PRS scheduling method considering Groupcast positioning slot structure-3 will be proposed hereinbelow. The PRS scheduling method considering Groupcast positioning slot structure-3 may have features similar to the above-described PRS scheduling method of Embodiment 1.

PRS Scheduling:

P-PRS scheduling preconfigures one-to-many correspondence between one request PRS and a plurality of response PRSs, similar to P-PRS scheduling of Embodiment 1 and also preconfigures one-to-one correspondence between one request PRS and one subchannel.

F-PRS Scheduling:

Proposed P-PRS scheduling will be described hereinbelow. Unlike P-PRS scheduling, in F-PRS scheduling, the positioning UE selects and reserves a request PRS available in a request pool by sensing the PSCCH and/or the PSSCH transmitted through the NR-V2X slot and selects and reserves a plurality of response PRSs available in a response pool for the AN group. In this case, the reservation information includes information about a request PRS pattern for the positioning UE and an OFDM symbol location for transmitting the request PRS in a request PRS pool and includes information about a response PRS pattern group for the AN group and an OFDM symbol location for transmitting a response PRS group in a response PRS pool.

The main positioning operation of the UE based on the Groupcast positioning slot structure-3 may be the same as the main positioning operation of the UE based on Groupcast positioning slot structure-1 described in Embodiment 1.

[Embodiment-4]: PRS Scheduling Methods Considering Groupcast Slot Structure-4

A PRS scheduling method using Groupcast positioning slot structure-4 similar to Groupcast positioning slot structure-3 described above will be described hereinbelow.

Figure 18:
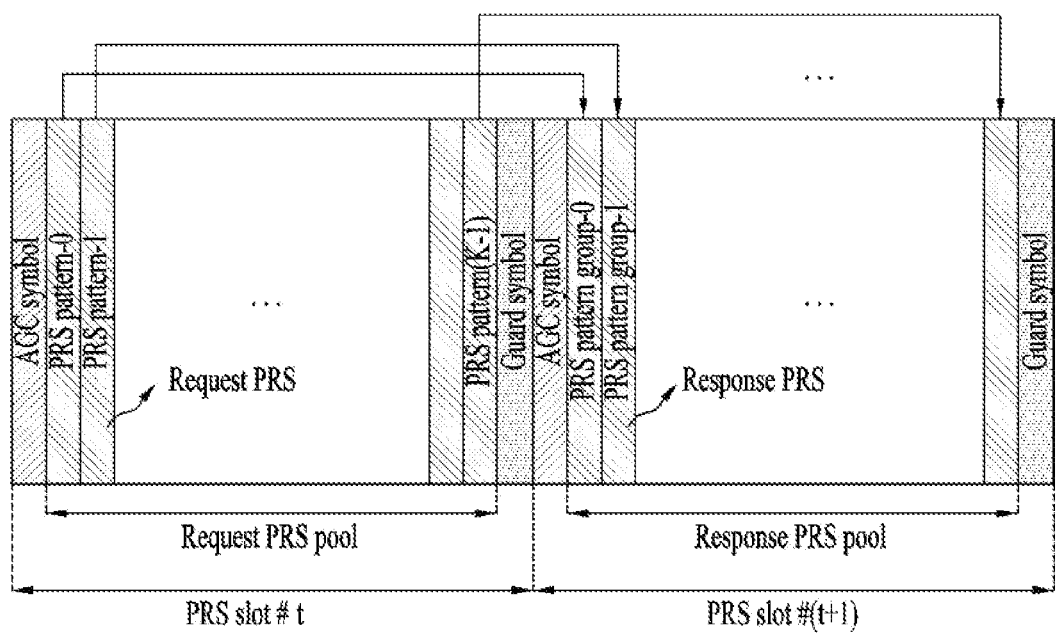

FIG. 18 illustrates Groupcast positioning slot structure-4. Main structural features and operation methods related to a groupcast positioning operation are as follows.

—Features and Operation Methods of Groupcast Positioning Slot Structure-2:

The positioning UE may transmit a request PRS using a request PRS pool resource of a PRS slot, and the AN group may transmit a response PRS using a response PRS pool resource of the PRS slot in response to the request PRS received from the UE. Each AN of the AN group may transmit a measured ToA or TRTD value through a PSSCH of an NR-V2X slot.

The positioning UE may transmit information such as scheduling information for the request PRS, scheduling information for the response PRS related to the AN group, reservation information for the request/response PRS through a PSCCH and/or the PSSCH of the NR-V2X slot.

Hereinafter, the PRS scheduling method considering Groupcast positioning slot structure-4 will be described. The proposed PRS scheduling method may have similar characteristics to the PRS scheduling method of Embodiment 3 described above except for the PRS scheduling operation method through the subchannel pool in the PRS slot.

P-PRS Scheduling:

A method similar to the method described in the P-PRS scheduling method of FIG. 17 is applicable to P-PRS scheduling considering Groupcast positioning slot structure-4 of FIG. 18. More specifically, one-to-many correspondence between one request PRS and a plurality of response PRSs may be preconfigured, and one-to-one correspondence between one request PRS and one subchannel may be preconfigured. Therefore, fast PRS scheduling may be performed and signaling overhead may be reduced by applying the P-PRS scheduling method to Groupcast positioning slot structure-2.

PRS scheduling may be performed through the PSCCH and/or the PSSCH of the NR-V2X slot. PRS scheduling information included in the PSCCH and/or the PSSCH transmitted through the NR-V2X slot may be the same as the information described in P-PRS scheduling of Embodiment 1. Main features related to P-PRS scheduling may be the same as the main features described in P-PRS scheduling of Embodiment 1 except for the PRS scheduling operation through the subchannel pool.

F-PRS scheduling:

Proposed F-PRS scheduling will be described hereinbelow. Unlike P-PRS described above, in F-PRS scheduling, the positioning UE selects and reserves a request PRS available in a request pool by sensing the PSCCH and/or the PSSCH transmitted through the NR-V2X slot and selects and reserves a plurality of response PRSs available in a response pool for the AN group. In this case, reservation information may include information about a request PRS pattern for the positioning UE and an OFDM symbol location for transmitting the request PRS in a request PRS pool and includes information about a response PRS pattern group for the AN group and an OFDM symbol location for transmitting a response PRS group in a response PRS pool.

The main positioning operation of the UE based on Groupcast positioning slot structure-4 may be the same as the main positioning operation of the UE based on Groupcast positioning slot structure-1.

Hereinbelow effects according to the proposal of the present disclosure will be described.

The present disclosure relates to P-PRS scheduling and F-PRS scheduling capable of effectively controlling collision between PRSs that may arise due to using the same request PRS pattern between positioning UEs, using non-orthogonal response PRS patterns between AN groups, or using the same response PRS pattern between ANs in an AN group in the groupcast positioning operation of a UE using sidelink. In particular, the present disclosure has proposed PRS scheduling methods considering 4 groupcast positioning slot structures in which a positioning UE transmits a request PRS to an AN group and the AN group transmits a response PRS to the positioning UE in response to the request PRS. The PRS scheduling methods of the present disclosure provide the following advantages.

In each groupcast positioning slot structure, P-PRS scheduling preconfigures one-to-many correspondence between one request PRS and a plurality of response PRSs and one-to-one correspondence between one request PRS and one subchannel, so that an additional response PRS scheduling method for the AN group is not needed and signaling overhead may be reduced.

In each groupcast positioning slot structure, F-PRS scheduling is configured such that a request PRS available in a request pool is selected and reserved, and a plurality of response PRSs available in a response pool for an AN group is selected and reserved. The method of reserving request PRS and plural response PRSs through such sensing requires request PRS scheduling and response PRS scheduling and increases overhead but provides high flexibility in a change in the size of the AN group.

Figure 19:
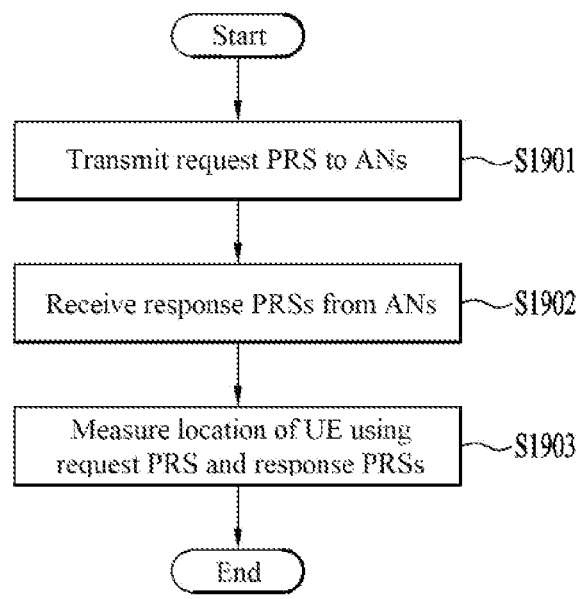

FIG. 19 is a flowchart for explaining embodiment(s) of the present disclosure.

The flowchart illustrates the operation of a positioning UE or an AN related to the above-described embodiments of the present disclosure. However, the above flowchart does not necessarily mean that all steps are performed or that only the steps are performed, and necessary steps may be performed or unnecessary steps may be omitted, according to the contents described in the above embodiments of the present disclosure. The operation of the flowchart may constitute one of the above-described proposals.

Referring to FIG. 19, the UE may transmit a request PRS to ANs through an NR-V2X slot or a PRS slot in step S1901.

In step S1902, the UE may receive response PRSs through the NR-V2X slot or the PRS slot from the ANs. The response PRSs may be configured with different patterns for respective ANs or may be transmitted in different symbols. The ANs are a group configured to easily position the UE, and the UE and the ANs may perform groupcast communication.

In step S1903, the UE may measure the location thereof using the request PRS and the response PRSs. More specifically, the UE may be aware of a transmission time of the request PRS and arrival times of the response PRSs and may receive information about the arrival time of the request PRS and the transmission times of the response PRSs from the ANs through a PSSCH. The UE may measure the location thereof in consideration of the transmission time of the request PRS and the arrival times of the response PRSs related to respective ANs.

In particular, the UE may transmit scheduling information about a resource and pattern on or with which the request PRS and the response PRSs are transmitted to the ANs. One-to-many correspondence between the scheduling information of the request PRS and the scheduling information of the response PRSs corresponding thereto may be preconfigured. This preconfigured one-to-many correspondence may be shared between the UE and the ANs. In this case, the UE may transmit only the scheduling information of the request PRS to the ANs. The ANs may receive the scheduling information of the request PRS and may be aware of the scheduling information of the response PRSs corresponding thereto. Accordingly, signaling overhead for transmission of the scheduling information of the response PRSs may be reduced.

In another embodiment, the UE may transmit both the scheduling information of the request PRS and the scheduling information of the response PRSs to the ANs. Accordingly, resources may be efficiently used through flexible scheduling.

Example of Communication System to which the Present Disclosure is Applied

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 20:
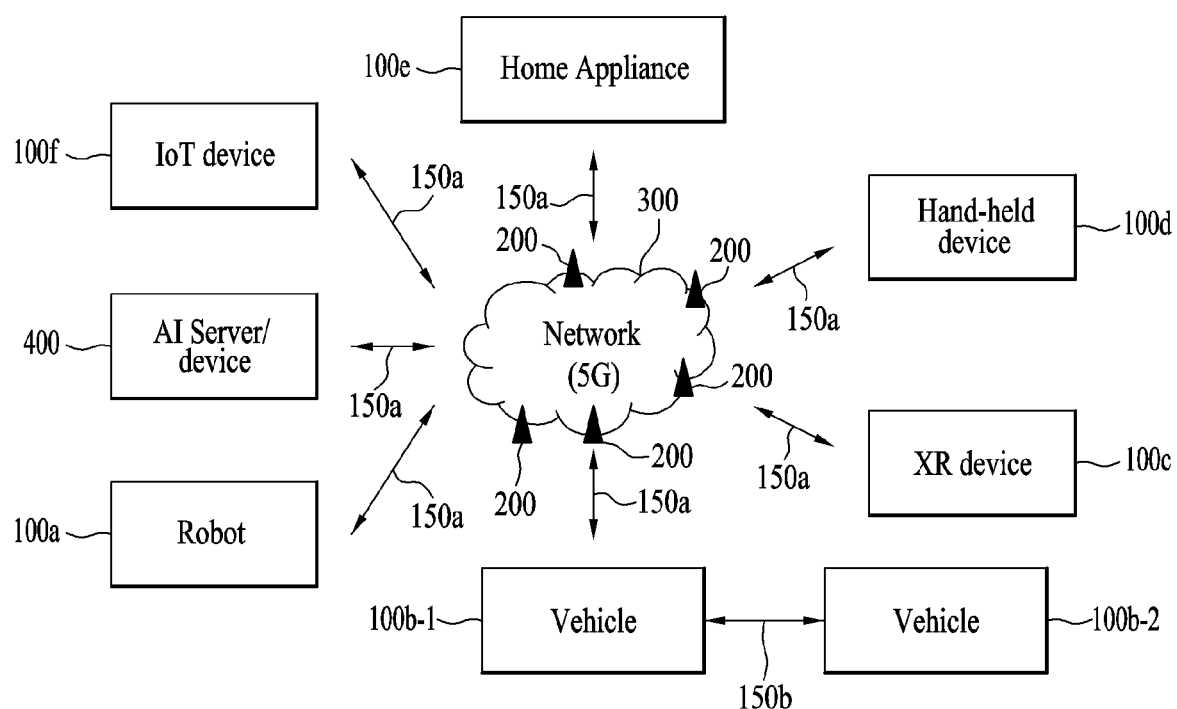
FIGS. 20 to 29 are block diagrams illustrating various devices applicable to embodiment(s) of the present disclosure.

FIG. 20 illustrates a communication system applied to the present disclosure.

Referring to FIG. 20, a communication system applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Devices to which the Present Disclosure is Applied

Figure 21:
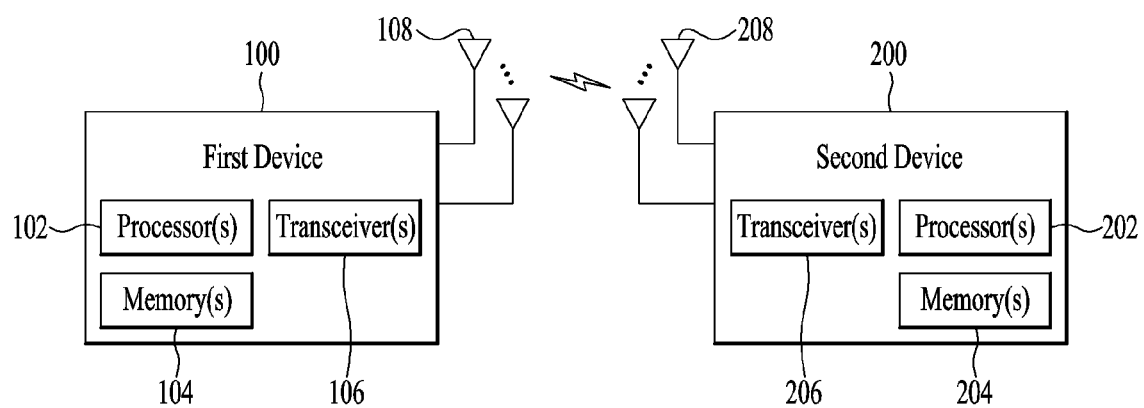

FIG. 21 illustrates wireless devices applicable to the present disclosure.

Referring to FIG. 21, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 20.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

The wireless communication technology implemented in the wireless devices 100 and 200 of the present disclosure may include a narrowband Internet of Things for low-power communication as well as LTE, NR, and 6G. For example, NB-IoT may be an example of low power wide area network (LPWAN) and implemented as standards such as LTE Cat NB1 and/or LTE Cat NB2, not limited to these names. Additionally or alternatively, the wireless communication technology implemented in the wireless devices 100 and 200 of the present disclosure may perform communication in LTE-M. In this case, for example, LTE-M may be an example of LPWAN and called by various names such as enhanced machine type communication (eMTC). For example, LTE-M may be implemented as at least one of 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, not limited to these names. Additionally or alternatively, the wireless communication technology implemented in the wireless devices 100 and 200 of the present disclosure may include at least one of ZigBee, Bluetooth, or LPWAN in consideration of low power communication, not limited to these names. For example, ZigBee may generate a personal area network (PAN) related to small/low-power digital communication based on various standards such as IEEE 802.15.4, and may be called by various names.

Example of a Signal Process Circuit to which the Present Disclosure is Applied

Figure 22:
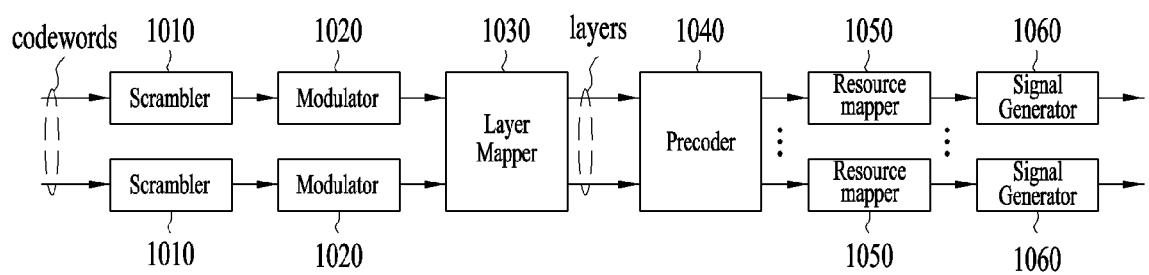

FIG. 22 illustrates a signal process circuit for a transmission signal.

Referring to FIG. 22, a signal processing circuit 1000 may include scramblers 1010, modulators 1020, a layer mapper 1030, a precoder 1040, resource mappers 1050, and signal generators 1060. An operation/function of FIG. 22 may be performed, without being limited to, the processors 102 and 202 and/or the transceivers 106 and 206 of FIG. 21. Hardware elements of FIG. 22 may be implemented by the processors 102 and 202 and/or the transceivers 106 and 206 of FIG. 21. For example, blocks 1010 to 1060 may be implemented by the processors 102 and 202 of FIG. 21. Alternatively, the blocks 1010 to 1050 may be implemented by the processors 102 and 202 of FIG. 21 and the block 1060 may be implemented by the transceivers 106 and 206 of FIG. 21.

Codewords may be converted into radio signals via the signal processing circuit 1000 of FIG. 22. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 22. For example, the wireless devices (e.g., 100 and 200 of FIG. 21) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 23:
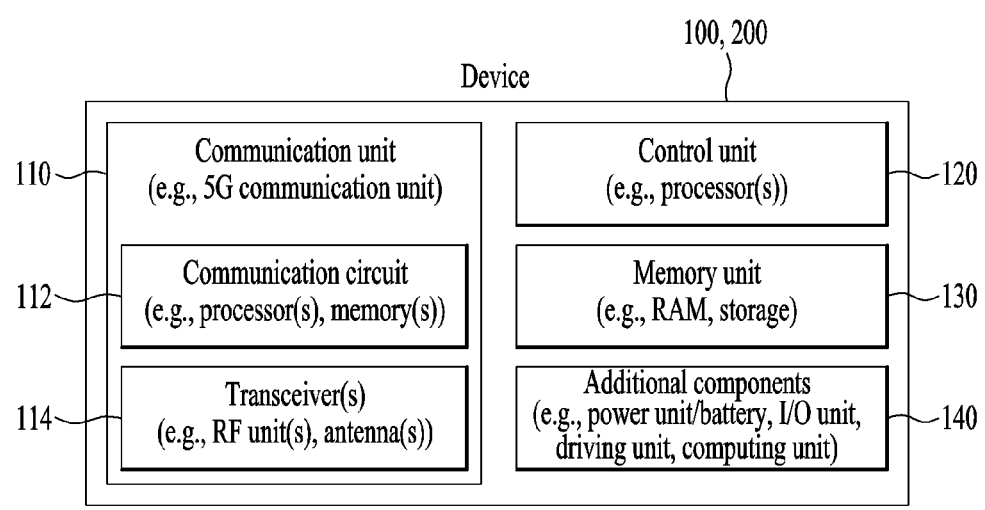

Application Example of a Wireless Device to which the Present Disclosure is Applied FIG. 23 illustrates another example of a wireless device applied to the present disclosure. The wireless device may be implemented in various forms according to a use-case/service (refer to FIG. 20).

Referring to FIG. 23, wireless devices 100 and 200 may correspond to the wireless devices 100 and 200 of FIG. 21 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 21. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 20), the vehicles (100b-1 and 100b-2 of FIG. 20), the XR device (100c of FIG. 20), the hand-held device (100d of FIG. 20), the home appliance (100e of FIG. 20), the IoT device (100f of FIG. 20), a digital broadcast terminal, a hologram device, a public safety device, an MTC device, a medicine device, a fintech device (or a finance device), a security device, a climate/environment device, the AI server/device (400 of FIG. 20), the BSs (200 of FIG. 20), a network node, etc. The wireless device may be used in a mobile or fixed place according to a use-example/service.

In FIG. 23, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 23 will be described in detail with reference to the drawings.

Example of Hand-Held Device to which the Present Disclosure is Applied

Figure 24:
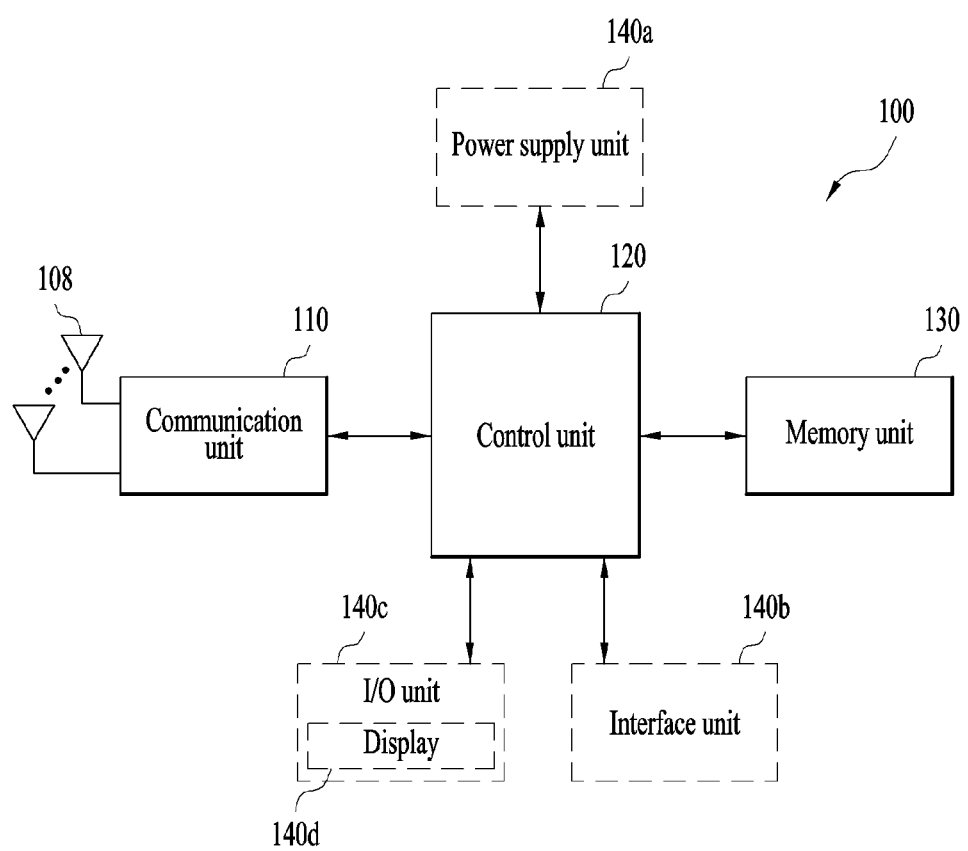

FIG. 24 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 24, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 23, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 25:
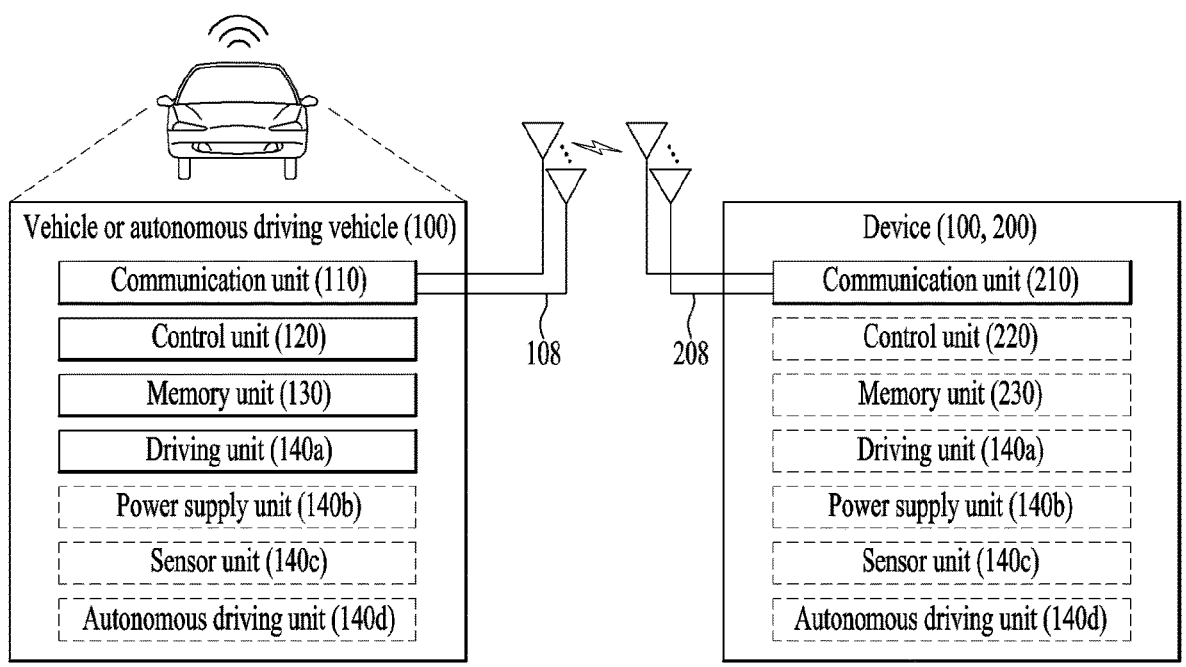

Example of a Vehicle or an Autonomous Driving Vehicle to which the Present Disclosure is Applied FIG. 25 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 25, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 23, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Examples of AR/VR and Vehicle to which the Present Disclosure is Applied

Figure 26:
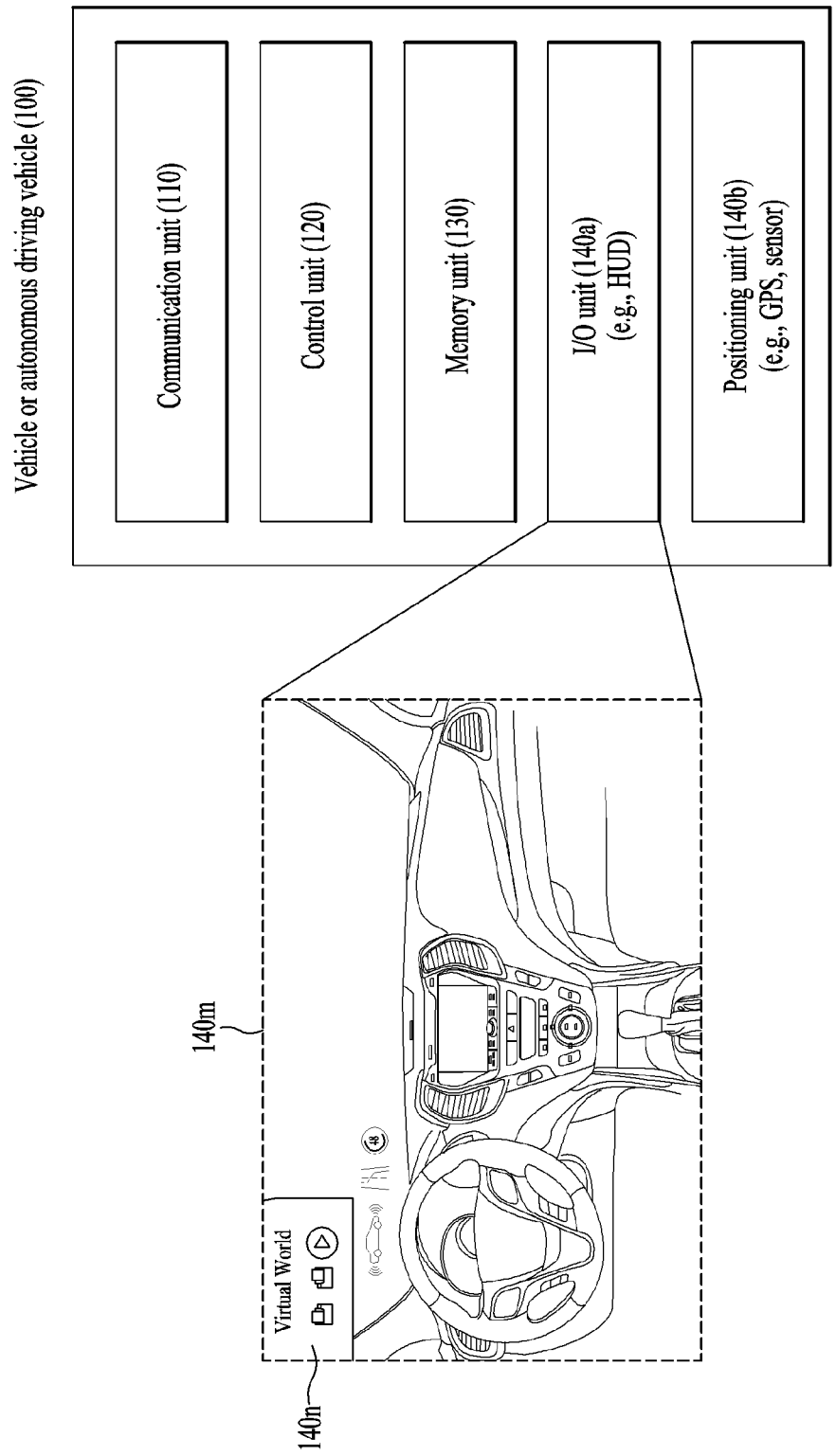

FIG. 26 illustrates a vehicle applied to the present disclosure. The vehicle may be implemented as a transport means, an aerial vehicle, a ship, etc.

Referring to FIG. 26, a vehicle 100 may include a communication unit 110, a control unit 120, a memory unit 130, an I/O unit 140a, and a positioning unit 140b. Herein, the blocks 110 to 130/140a and 140b correspond to blocks 110 to 130/140 of FIG. 23.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140a may output an AR/VR object based on information within the memory unit 130. The I/O unit 140a may include an HUD. The positioning unit 140b may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140b may include a GPS and various sensors.

As an example, the communication unit 110 of the vehicle 100 may receive map information and traffic information from an external server and store the received information in the memory unit 130. The positioning unit 140b may obtain the vehicle position information through the GPS and various sensors and store the obtained information in the memory unit 130. The control unit 120 may generate a virtual object based on the map information, traffic information, and vehicle position information and the I/O unit 140*a* may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140*a*. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

Examples of XR Device to which the Present Disclosure is Applied

Figure 27:
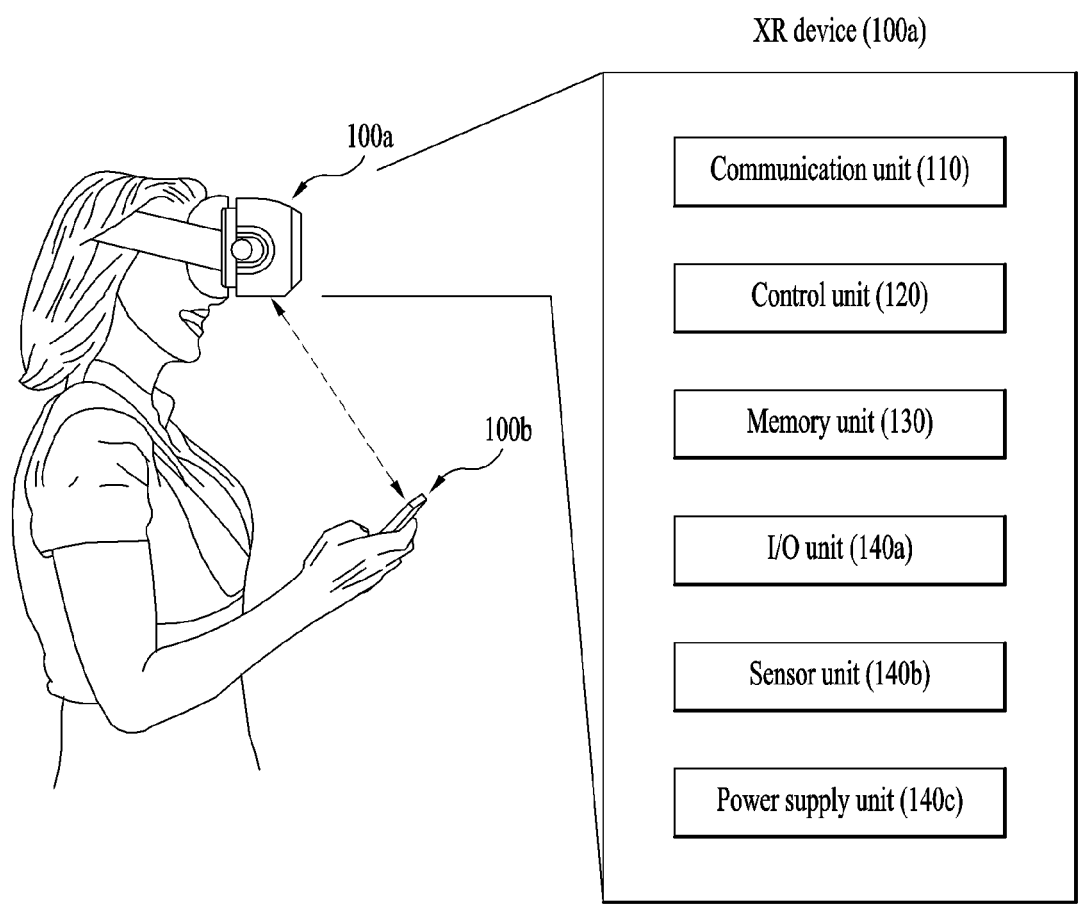

FIG. 27 illustrates an XR device applied to the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 27, an XR device 100*a* may include a communication unit 110, a control unit 120, a memory unit 130, an I/O unit 140*a*, a sensor unit 140*b*, and a power supply unit 140*c*. Herein, the blocks 110 to 130/140*a* to 140*c* correspond to the blocks 110 to 130/140 of FIG. 23, respectively.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100*a*. For example, the control unit 120 may be configured to control and/or perform procedures such as video/image acquisition, (video/image) encoding, and metadata generation and processing. The memory unit 130 may store data/parameters/programs/code/commands needed to drive the XR device 100*a*/generate XR object. The I/O unit 140*a* may obtain control information and data from the exterior and output the generated XR object. The I/O unit 140*a* may include a camera, a microphone, a user input unit, a display unit, a speaker, and/or a haptic module. The sensor unit 140*b* may obtain an XR device state, surrounding environment information, user information, etc. The sensor unit 140*b* may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140*c* may supply power to the XR device 100*a* and include a wired/wireless charging circuit, a battery, etc.

For example, the memory unit 130 of the XR device 100*a* may include information (e.g., data) needed to generate the XR object (e.g., an AR/VR/MR object). The I/O unit 140*a* may receive a command for manipulating the XR device 100*a* from a user and the control unit 120 may drive the XR device 100*a* according to a driving command of a user. For example, when a user desires to watch a film or news through the XR device 100*a*, the control unit 120 transmits content request information to another device (e.g., a hand-held device 100*b*) or a media server through the communication unit 130. The communication unit 130 may download/stream content such as films or news from another device (e.g., the hand-held device 100*b*) or the media server to the memory unit 130. The control unit 120 may control and/or perform procedures such as video/image acquisition, (video/image) encoding, and metadata generation/processing with respect to the content and generate/output the XR object based on information about a surrounding space or a real object obtained through the I/O unit 140*a*/sensor unit 140*b*.

The XR device 100*a* may be wirelessly connected to the hand-held device 100*b* through the communication unit 110 and the operation of the XR device 100*a* may be controlled by the hand-held device 100*b*. For example, the hand-held device 100*b* may operate as a controller of the XR device 100*a*. To this end, the XR device 100*a* may obtain information about a 3D position of the hand-held device 100*b* and generate and output an XR object corresponding to the hand-held device 100*b*.

Examples of Robot to which the Present Disclosure is Applied

Figure 28:
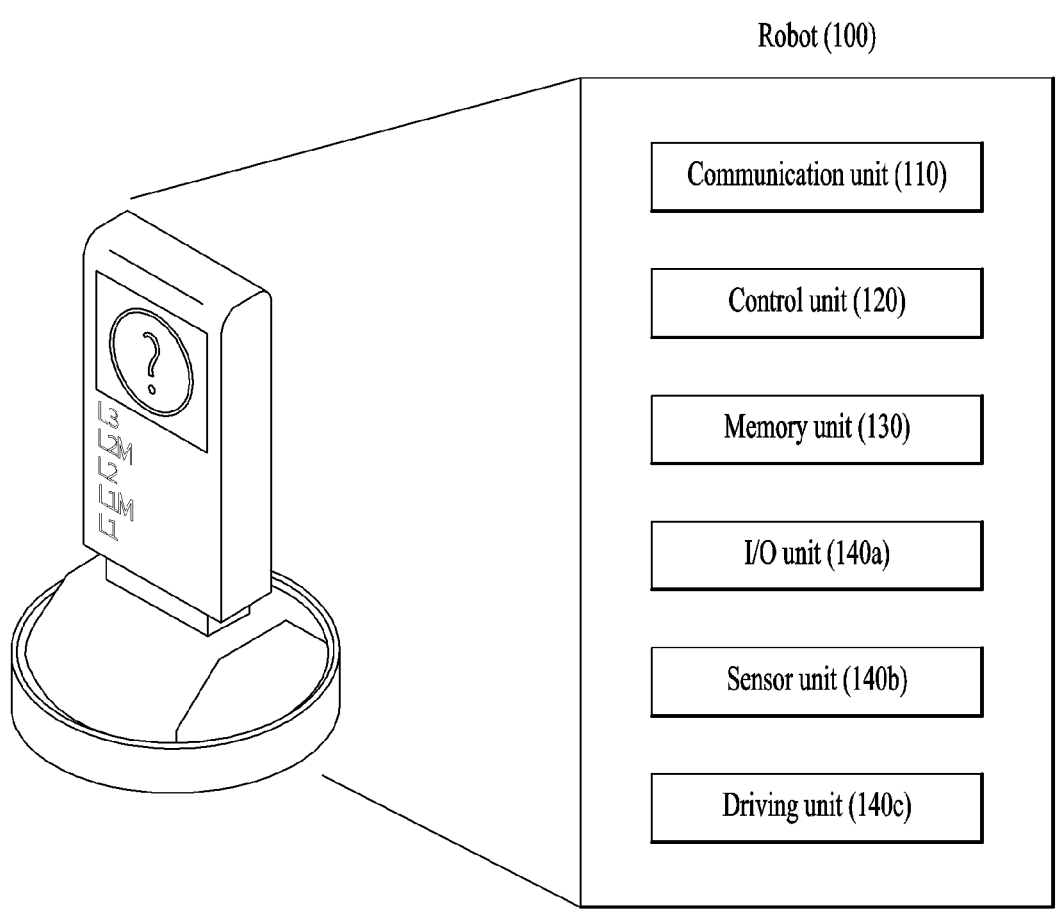

FIG. 28 illustrates a robot applied to the present disclosure. The robot may be categorized into an industrial robot, a medical robot, a household robot, a military robot, etc., according to a used purpose or field.

Referring to FIG. 28, a robot 100 may include a communication unit 110, a control unit 120, a memory unit 130, an I/O unit 140*a*, a sensor unit 140*b*, and a driving unit 140*c*. Herein, the blocks 110 to 130/140*a* to 140*c* correspond to the blocks 110 to 130/140 of FIG. 23, respectively.

The communication unit 110 may transmit and receive signals (e.g., driving information and control signals) to and from external devices such as other wireless devices, other robots, or control servers. The control unit 120 may perform various operations by controlling constituent elements of the robot 100. The memory unit 130 may store data/parameters/programs/code/commands for supporting various functions of the robot 100. The I/O unit 140*a* may obtain information from the exterior of the robot 100 and output information to the exterior of the robot 100. The I/O unit 140*a* may include a camera, a microphone, a user input unit, a display unit, a speaker, and/or a haptic module. The sensor unit 140*b* may obtain internal information of the robot 100, surrounding environment information, user information, etc. The sensor unit 140*b* may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140*c* may perform various physical operations such as movement of robot joints. In addition, the driving unit 140*c* may cause the robot 100 to travel on the road or to fly. The driving unit 140*c* may include an actuator, a motor, a wheel, a brake, a propeller, etc.

Examples of AI Device to which the Present Disclosure is Applied

Figure 29:
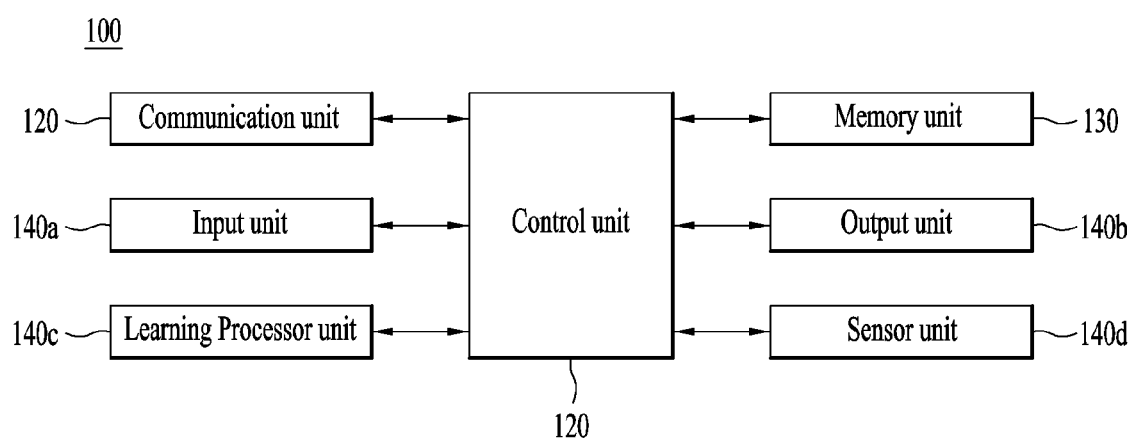

FIG. 29 illustrates an AI device applied to the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 29, an AI device 100 may include a communication unit 110, a control unit 120, a memory unit 130, an I/O unit 140*a*/140*b*, a learning processor unit 140*c*, and a sensor unit 140*d*. The blocks 110 to 130/140*a* to 140*d* correspond to blocks 110 to 130/140 of FIG. 23, respectively.

The communication unit 110 may transmit and receive wired/radio signals (e.g., sensor information, user input, learning models, or control signals) to and from external devices such as other AI devices (e.g., 100x, 200, or 400 of FIG. 20) or an AI server (e.g., 400 of FIG. 20) using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analysis algorithm or a machine learning algorithm. The control unit 120 may perform an operation determined by controlling constituent elements of the AI device 100. For example, the control unit 120 may request, search, receive, or use data of the learning processor unit 140c or the memory unit 130 and control the constituent elements of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140c or transmit the collected information to an external device such as an AI server (400 of FIG. 20). The collected history information may be used to update a learning model.

The memory unit 130 may store data for supporting various functions of the AI device 100. For example, the memory unit 130 may store data obtained from the input unit 140a, data obtained from the communication unit 110, output data of the learning processor unit 140c, and data obtained from the sensor unit 140. The memory unit 130 may store control information and/or software code needed to operate/drive the control unit 120.

The input unit 140a may acquire various types of data from the exterior of the AI device 100. For example, the input unit 140a may acquire learning data for model learning, and input data to which the learning model is to be applied. The input unit 140a may include a camera, a microphone, and/or a user input unit. The output unit 140b may generate output related to a visual, auditory, or tactile sense. The output unit 140b may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140c may learn a model consisting of artificial neural networks, using learning data. The learning processor unit 140c may perform AI processing together with the learning processor unit of the AI server (400 of FIG. 20). The learning processor unit 140c may process information received from an external device through the communication unit 110 and/or information stored in the memory unit 130. In addition, an output value of the learning processor unit 140c may be transmitted to the external device through the communication unit 110 and may be stored in the memory unit 130.

INDUSTRIAL APPLICABILITY

The above-described embodiments of the present disclosure are applicable to various mobile communication systems.

The invention claimed is:

1. A method of performing an operation by a user equipment (UE) in a wireless communication system, the method comprising:
    transmitting a first reference signal (RS) related to a location of the UE to nodes;
    receiving second RSs based on the first RS from the nodes;
    receiving information about an arrival time of the first RS and transmission times of the second RSs from the nodes; and
    measuring the location of the UE based on the first RS and the second RSs,
    wherein the UE transmits scheduling information related to the first RS and the second RSs to the nodes.

2. The method of claim 1, wherein the response second RSs are configured with different patterns with respect to the nodes.

3. The method of claim 1, wherein one-to-many correspondence between scheduling information of the first RS and scheduling information of the second RSs related with the scheduling information of the first RS is preconfigured.

4. The method of claim 3, wherein the scheduling information related to the first RS and the second RSs includes only the scheduling information of the first RS, and the scheduling information of the second RSs is determined by the scheduling information of the first RS.

5. The method of claim 1, wherein the scheduling information related to the first RS and the second RSs includes scheduling information of the first RS and scheduling information of the second RSs.

6. The method of claim 1, wherein the first RS is transmitted in a slot for communication between UEs or a dedicated slot for the first RS, and the second RSs are transmitted in the dedicated slot.

7. The method of claim 1, wherein the information about the arrival time of the first RS and the transmission times of the second RSs are received through a physical data channel for communication between UEs.

8. The method of claim 1, wherein the nodes form a group for measuring the location of the UE.

9. A user equipment (UE) in a wireless communication system, the UE comprising:
    at least one processor; and
    at least one computer memory operably connected to the at least one processor and configured to store instructions causing, when executed, the at least one processor to perform operations,
    wherein the operations include:
    transmitting a first reference signal (RS) related to a location of the UE to nodes;
    receiving second RS based on the first RS from the nodes;
    receiving information about an arrival time of the first RS and transmission times of the second RSs from the nodes; and
    measuring the location of the UE based on the first RS and the second RSs, and
    wherein the UE transmits scheduling information related to the first RS and the second RSs to the nodes.

10. The UE of claim 9, wherein the UE communicates with at least one of another UE, a UE related to an autonomous driving vehicle, a base station, or a network.

11. A processor for performing operations for a user equipment (UE) in a wireless communication system,
    wherein the operations include:
    transmitting a first reference signal (RS) related to a location of the UE to nodes;

receiving second response RSs based on the first RS from the nodes;
receiving information about an arrival time of the first RS and transmission times of the second RSs from the nodes; and
measuring the location of the UE based on the first RS and the second RSs,
wherein the UE transmits scheduling information related to the first PRS and the second RSs to the nodes.

* * * * *